(12) United States Patent
Endo et al.

(10) Patent No.: US 7,052,079 B2
(45) Date of Patent: May 30, 2006

(54) VEHICULAR HOOD STRUCTURE AND VEHICLE BODY FRONT PORTION STRUCTURE

(75) Inventors: Yoshihide Endo, Okazaki (JP); Kouichi Mizukami, Okazaki (JP); Hiroshi Kayukawa, Nissin (JP); Akira Maekubo, Toyota (JP); Minoru Suzuki, Aichi-ken (JP); Yasunari Fujisawa, Okazaki (JP); Hiroto Usui, Kasugai (JP); Kazuhiko Miyadera, Brussels (BE)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/879,743

(22) Filed: Jun. 30, 2004

(65) Prior Publication Data

US 2005/0001453 A1    Jan. 6, 2005

(30) Foreign Application Priority Data

| Jul. 1, 2003 | (JP) | ............................. 2003-189499 |
| Jul. 4, 2003 | (JP) | ............................. 2003-191695 |
| Jul. 8, 2003 | (JP) | ............................. 2003-193382 |

(51) Int. Cl.
B62D 25/10    (2006.01)

(52) U.S. Cl. .............................. 296/193.11; 296/187.09

(58) Field of Classification Search ........... 296/187.03, 296/187.09, 191, 193.11; 180/69.2, 69.21
See application file for complete search history.

(56) References Cited

U.S. PATENT DOCUMENTS

| 5,000,997 A * | 3/1991 | Ritchie et al. ............... 296/191 |
| 5,115,878 A * | 5/1992 | Hayata ................... 296/187.09 |
| 5,605,371 A * | 2/1997 | Borchelt et al. ....... 296/187.09 |
| 6,179,364 B1 * | 1/2001 | Takahashi ................... 296/191 |
| 6,398,286 B1 * | 6/2002 | Devin et al. ................ 180/69.2 |
| 2004/0021342 A1 * | 2/2004 | Fujimoto ............... 296/193.11 |
| 2005/0082875 A1 * | 4/2005 | Ikeda et al. ............ 296/193.11 |

FOREIGN PATENT DOCUMENTS

| DE | 100 38 812 A1 | 2/2002 |
| EP | 1 318 062 A2 | 11/2002 |
| GB | 2 379 481 A | 3/2003 |
| JP | 5-155356 | 6/1993 |
| JP | 05-278637 | 10/1993 |
| JP | 06-072355 | 3/1994 |
| JP | 06-312670 | 11/1994 |
| JP | 8-318875 | 12/1996 |
| JP | 11-321714 | 11/1999 |
| JP | 2001-191962 | 7/2001 |
| JP | 2001-301541 | 10/2001 |

* cited by examiner

OTHER PUBLICATIONS

European Search Report dated Sep. 29, 2005.

*Primary Examiner*—Jason Morrow
(74) *Attorney, Agent, or Firm*—Finnegan, Henderson, Farabow, Garrett & Dunner, L.L.P.

(57) ABSTRACT

In order to archive to improve impact absorbing efficiency and lower production costs, a vehicular hood structure comprising an outer member configuring a vehicle body outer side surface of a hood and an inner member disposed at the inner side of the outer member, wherein the vehicular hood structure includes a front end portion inner member configuring a front end portion of the inner member, a rear end portion inner member configuring a rear end portion of the inner member, and a front-rear direction inner member that is disposed along the vehicle body front-rear direction between the front end portion configuration member and the rear end portion configuration member and which bridges the front end portion configuration member and the rear end portion configuration member is provided.

18 Claims, 31 Drawing Sheets

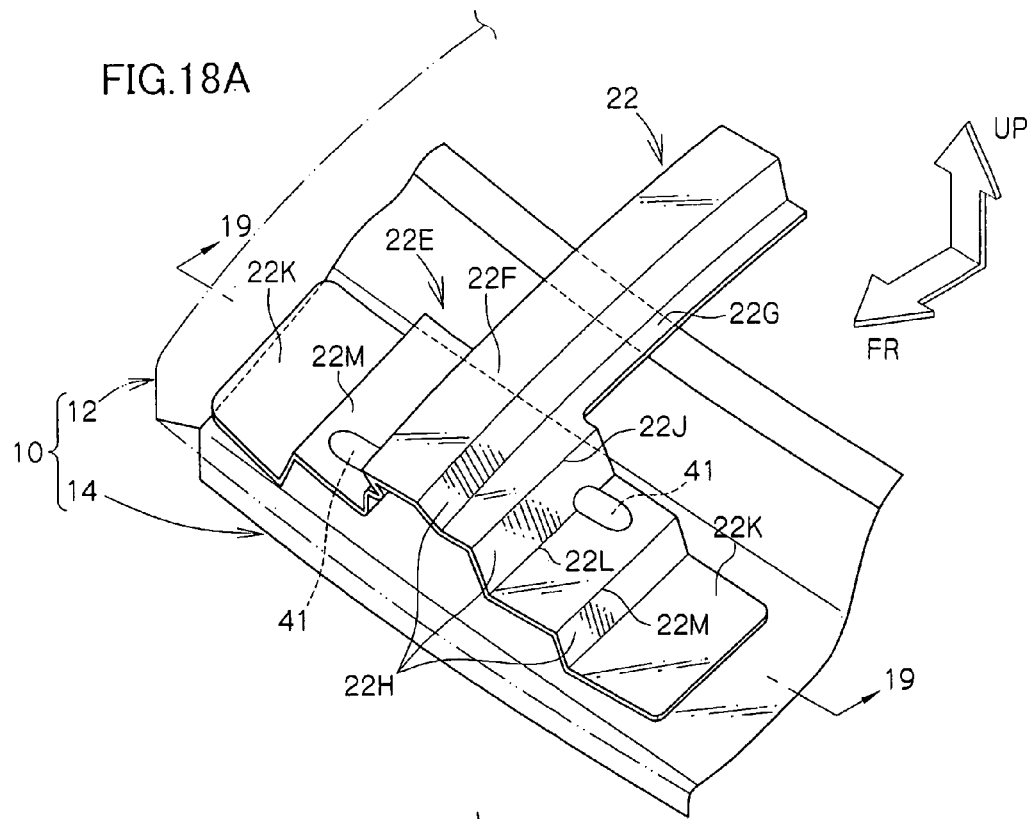
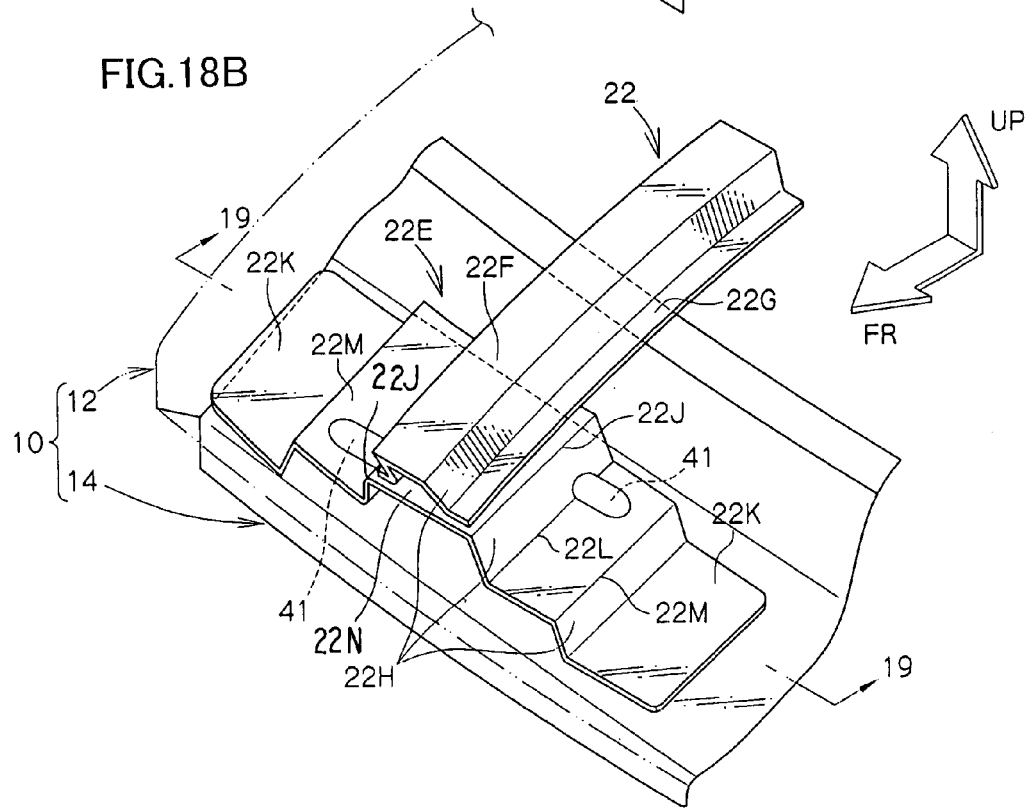

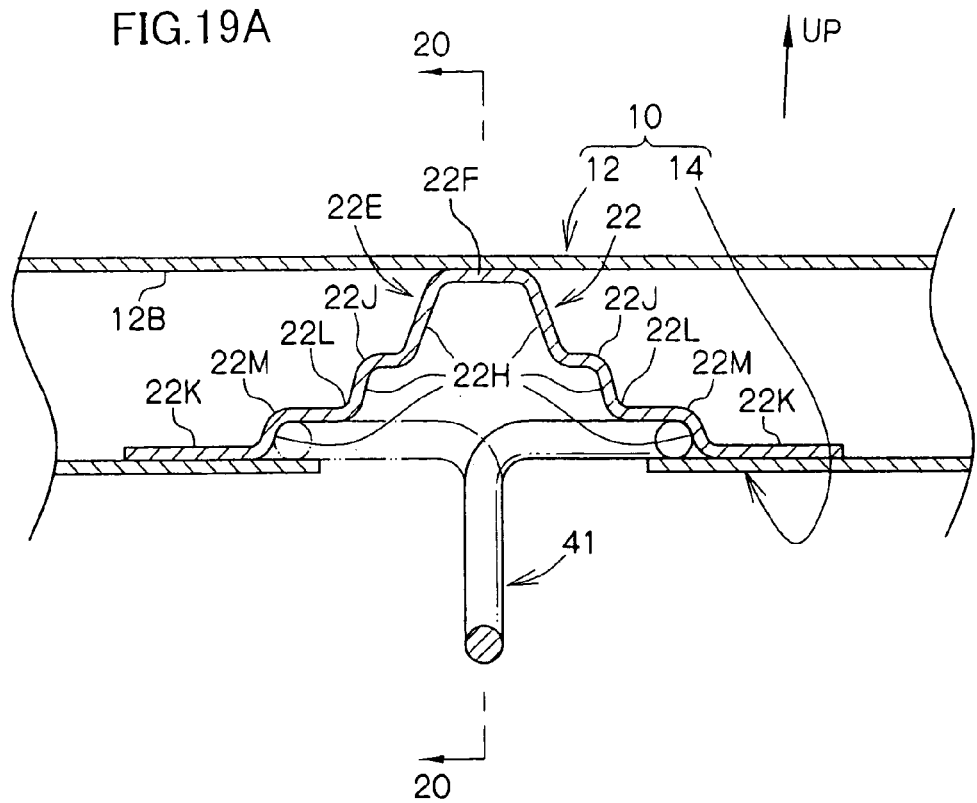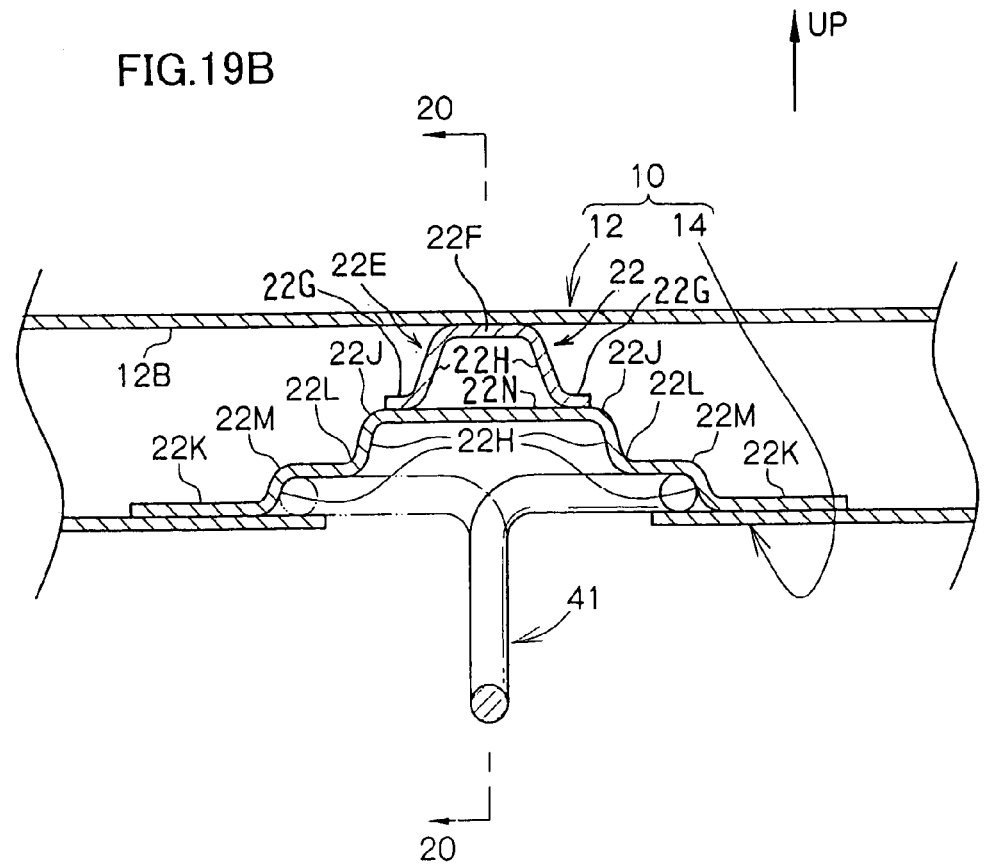

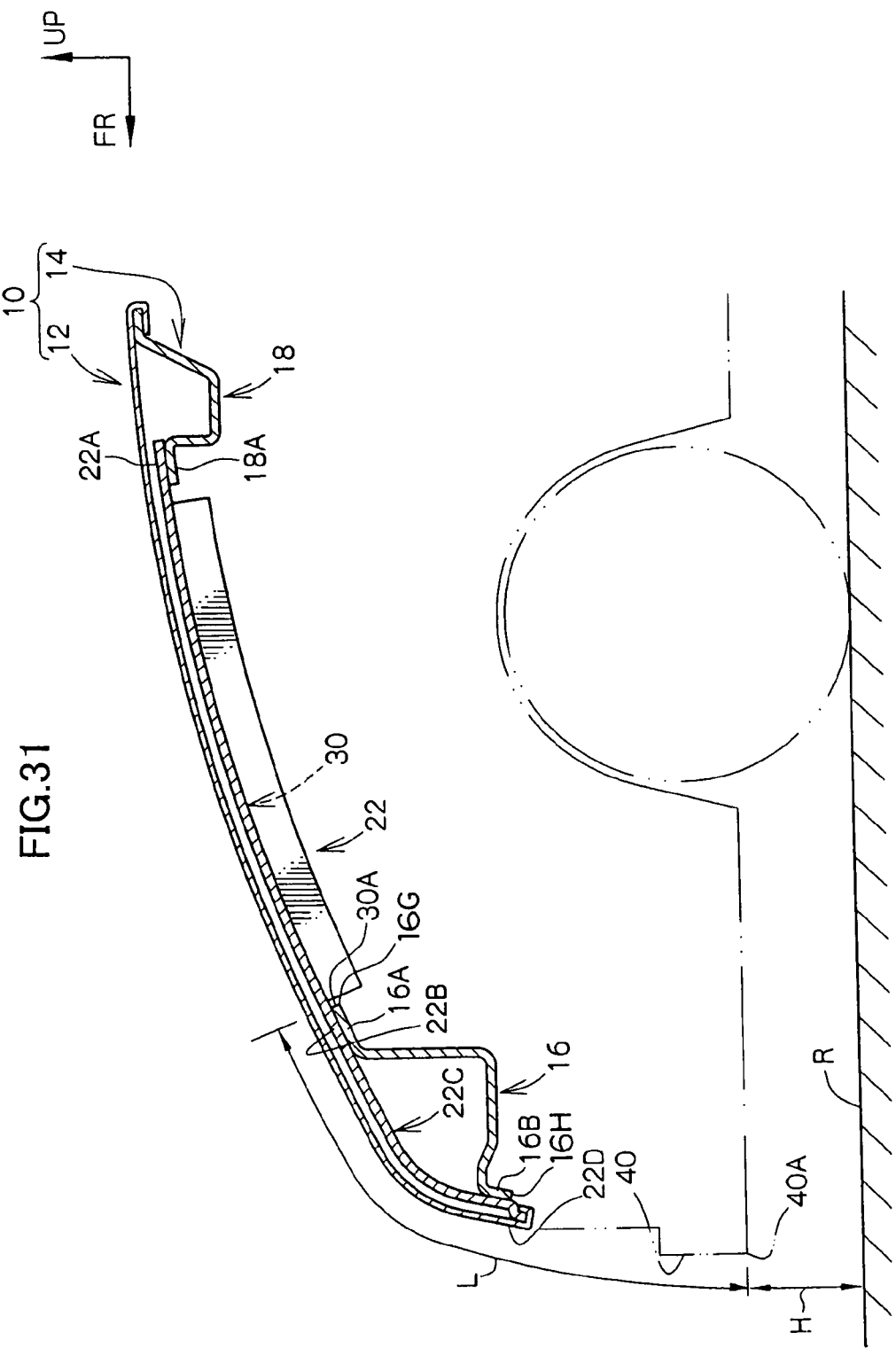

VEHICULAR HOOD STRUCTURE AND VEHICLE BODY FRONT PORTION STRUCTURE

CROSS-REFERENCE TO RELATED APPLICATION

This application claims priority under 35 USC 119 from Japanese Patent Applications Nos. 2003-189499, 2003-191695 and 2003-193382 the disclosures of which are incorporated by reference herein.

BACKGROUND OF THE INVENTION

1. Field of the Invention

The present invention relates to a vehicular hood structure and a vehicle body front portion structure, and in particular to a vehicular hood structure and a vehicle body front portion structure that protects a collision body at the time of a collision in a vehicle such as an automobile.

2. Description of the Related Art

Conventionally, with respect to a vehicular hood structure that protects a collision body at the time of a collision in a vehicle such as an automobile, a configuration is known where one inner member formed by press molding is integrated with an outer member by hemming, and a lock reinforcement is attached between the outer member and the inner member at a hood lock striker support portion (e.g., see Japanese Patent Application Laid-Open Publication (JP-A) No. 11-321714). A configuration is also known where the thickness of an aluminium alloy serving as the outer member is 0.5 mm to 2.0 mm and a reinforcement member that lines the outer member is about 3 mm to 15 mm (e.g., see JP-A No. 2001-191962). A configuration including an annularly-formed outer frame and an inner skeletal member that bridges the outer frame along the vehicle body front-rear direction is also known (e.g., see JP-A No. 6-72355). A configuration where the lock reinforcement includes walls extending in the vehicle body front-rear direction at the left and right sides of a hood lock striker is also known (e.g., see JP-A No. 6-312670). A configuration where the inner member comprises an annular frame skeleton and an inner skeleton that forms a closed cross section by being coupled to the frame skeleton inward of the frame skeleton, and where the longitudinal walls of the cross section are substantially vertical surfaces, is also known (e.g., see JP-A No. 5-278637). A configuration where the side end portions of the hood curve back inward and end portions hang down is also known (e.g., see JP-A No. 2001-301541).

However, with respect to the technology of JP-A No. 11-321714, the production costs are high because the inner member is a large pressed part. Also, because the closed cross section, which is formed by the outer member and the inner member and extends in the vehicle body front-rear direction and the vehicle width direction, and the lock reinforcement are disposed, deformation of the hood for absorbing impact when a collision body collides with the hood is obstructed, a reaction force in the vehicle body front-rear direction is generated, and the impact absorbing efficiency is lowered.

With respect to the vehicular hood structure (FIGS. 4 and 8) of JP-A No. 11-321714, a configuration is known where, in an automobile hood (also called a bonnet) where an inner panel (also called an inner frame) is integrated with an outer panel, a reinforcement panel attached to the inner panel is folded in the shape of Mt. Fuji by a front slanted panel, a top panel and a rear slanted panel, with a slit being disposed in the top panel so that the top panel is divided into a front top panel and a rear top panel, and edge reinforcement members that reinforce the edges of the front top panel and the rear top panel are attached to the front top panel and the rear top panel, whereby, when a collision body hits the vicinity of the attachment portion of the striker from the outer panel side, the outer panel is deformed, the outer panel is received by the edge reinforcement members respectively disposed at the front top panel and the rear top panel, the energy of the collision body is initially absorbed, and then the front slanted panel and the rear slanted panel secondarily absorb the energy of the flexing obstacle.

However, in JP-A No. 11-321714, the reinforcement panel is disposed in the front portion region of the hood. As a result, when a collision body collides with the rear portion region of the hood, the reinforcement panel has no energy absorbing effect with respect to the collision body.

Moreover, in the vehicle body front portion structure (FIGS. 5, 6 and 7) of JP-A No. 11-321714, a configuration is known where, with respect to an automobile hood where the inner panel is integrated with the outer panel, the inner panel is one molded part that is press-molded, and an open portion is formed in the inner panel in order to reduce weight and improve hood rigidity.

However, in JP-A No. 11-321714, the closed cross-sectional structure is formed by adhering the edge portion of the open portion of the inner panel to the undersurface of the outer panel, and although hood rigidity is improved, the collision load on the collision body is not uniform, regardless of differences in the vehicle width direction of the collision positions, when a collision body collides with the front portion region of the hood.

SUMMARY OF THE INVENTION

In consideration of the above-described facts, it is an object of the present invention to provide a vehicular hood structure with which it is possible to improve impact absorbing efficiency and lower production costs. It is another object of the invention to provide a vehicular hood structure that can improve energy absorbing efficiency with respect to a collision body when a collision body collides with the rear portion region of a hood. It is yet another object of the invention to provide a vehicle body front portion structure that can make uniform a collision load on a collision body, regardless of differences in the vehicle width direction of collision positions, when a collision body collides with the front portion region of a hood.

A first aspect of the invention provides a vehicular hood structure comprising an outer member configuring a vehicle body outer side surface of a hood and an inner member disposed at the inner side of the outer member, wherein the vehicular hood structure includes a front end portion inner member configuring a front end portion of the inner member, a rear end portion inner member configuring a rear end portion of the inner member, and a front-rear direction inner member that is disposed along the vehicle body front-rear direction between the front end portion inner member and the rear end portion inner member and which bridges the front end portion inner member and the rear end portion inner member.

Thus, because the inner member of the hood is divided into the front end portion inner member, the rear end portion inner member and the front-rear direction inner member, the inner member can be divided into plural long parts. As a result, progressive molding becomes possible and production yield increases. As a result, material costs, mold costs and processing costs of the hood can be reduced, and it becomes possible to reduce production costs. Also, because the front-rear direction inner member is disposed along the vehicle body front-rear direction between the front end portion inner member and the rear end portion inner member, when a collision body collides with the hood, deformation of the hood for absorbing the impact is smoothly carried out and a reaction force in the vehicle body front-rear direction is not generated. As a result, the impact absorbing efficiency can be improved A second aspect of the invention provides the vehicular hood structure of the first aspect, wherein respective couplings between the hood outer member, the front end portion inner member, the rear end portion inner member and the front-rear direction inner member are couplings in a separation (peeling) direction and a shearing direction.

Thus, in addition to the content of the first aspect, in both the separation direction and the shearing direction, the strength of the respective couplings between the hood outer member, the front end portion inner member, the rear end portion inner member and the front-rear direction inner member is improved, whereby sufficient joint strengths can be obtained even in joints resulting from adhesion.

A third aspect of the invention provides the vehicular hood structure of the first aspect, wherein a surface of the front-rear direction inner member opposing the outer member is smoothly formed, has a shape along (according to) an undersurface of the outer member and extends as far as front and rear ends of the outer member.

Thus, in addition to the content of the first aspect, in the vicinity of the front and rear end portions of the hood, by making flatly smooth the cross section of the surface of the front-rear direction inner member opposing the outer member, when a collision body collides with the hood, the possibility to generate an unnecessary deceleration load in the front-rear direction with respect to the collision body can be reduced.

A fourth aspect of the invention provides the vehicular hood structure of the first aspect, wherein a front end portion of the front-rear direction inner member extends above a hood lock or a hood stopper.

Thus, in addition to the content of the first aspect, because the front-rear direction inner member that generates an excellent collision acceleration is disposed above the hood lock or the hood stopper, an excellent collision acceleration can be generated even at a position above the hood lock or the hood stopper, where control of the collision load has conventionally been difficult.

A fifth aspect of the invention provides the vehicular hood structure of the third aspect, wherein a front end portion of the front-rear direction inner member is nipped and joined between the outer member and the front end portion inner member, and a rear end portion of the front-rear direction inner member is nipped and joined between the outer member and the rear end portion inner member.

Thus, in addition to the content of the third aspect, because each front-rear direction inner member disposed between the front end portion inner member and the rear end portion inner member has a dual supported beam structure, the timing of the load generation can be quickened.

A sixth aspect of the invention provides the vehicular hood structure of the third aspect, wherein side wall portions of a front end portion of the front-rear direction inner member are joined to one of the front end portion inner member or a lock reinforcement.

Thus, in addition to the content of the third aspect, because the front-rear direction inner member has a dual supported beam structure, the timing of the load generation can be quickened.

A seventh aspect of the invention provides the vehicular hood structure of the third aspect, wherein lower portions of left and right side walls of the front-rear direction inner member are joined to correspond to at least one of end portions of a hood lock striker.

Thus, in addition to the content of the third aspect, when a collision body collides with the hood directly above the hood lock striker, the cross section of the inner member expands in the vehicle width direction and is deformed. As a result, it becomes possible to control the deformation mode of the inner member using the load where both end portions of the hood lock striker are deformed so that they relatively move away from each other in the vehicle width direction.

An eighth aspect of the invention provides the vehicular hood structure of either of the sixth or seventh aspects, wherein a stepped portion including a fold line in the vehicle body front-rear direction is formed in the side wall portion of the front-rear direction inner member.

Thus, in addition to the content of either of the sixth or seventh aspects, the stepped portion including the fold line is disposed, whereby rapid change of geometrical moment of inertia (second moment of area) can be alleviated.

A ninth aspect of the invention provides the vehicular hood structure of the first aspect, wherein front and rear end portions of the front-rear direction inner members plurally disposed at predetermined intervals in the vehicle width direction are nipped and joined between the outer member and the front end portion inner member and the outer member and the rear end portion inner member, and between adjacent joint portions, gaps are formed between the outer member and the front end portion inner member and the outer member and the rear end portion inner member.

Thus, in addition to the content of the first aspect, control is effected, due to the flatly smooth surfaces of the front-rear direction inner members, so that an unnecessary collision acceleration is not generated at the portions where the front-rear direction inner members are present. Further, due to that gaps are formed between the outer member and the front end portion inner member and the outer member and the rear end portion inner member, between adjacent joint portions, the generation of an unnecessary acceleration for which there is the possibility for the front and rear end portions of the front end portion inner member and the rear end portion inner member to be joined to the inner surface of the outer member can be prevented.

A tenth aspect of the invention provides the vehicular hood structure of either of the first or ninth aspect, wherein an impact absorbing bracket is provided (intervened) between, at least one of a lower surface of the front-rear direction inner member and an upper surface of the front end portion inner member and the lower surface of the front-rear direction inner member and an upper surface of the rear end portion inner member.

Thus, in addition to the content of either of the first or ninth aspect, geometrical moment of inertia (second moment of area) of the front-rear direction inner member is determined by the rigidity required in the hood center region. For this reason, there is little freedom for the cross-sectional height of the front-rear direction inner member in the vicinity of the front and rear end portions, but by intervening the impact absorbing bracket, it becomes possible to generate a desired load (reaction force).

An eleventh aspect of the invention provides the vehicular hood structure of the first aspect, wherein a recessed portion formed in a front portion of the rear end portion inner member is partially or completely closed off by the front-rear direction inner member.

Thus, in addition to the content of the first aspect, an elastic deformation mode resulting from the recess can be eliminated, and the generation of a reaction force can be promptly launched A twelfth aspect of the invention provides a vehicular hood structure comprising an outer member configuring a vehicle body outer side surface of a hood and an inner member disposed at the inner side of the outer member, wherein the vehicular hood structure includes at least one open portion formed in the inner member, with a rear end edge portion of the open portion at a hood rear portion being set on an arcuate line where a vehicle width-direction center portion thereof is convex towards the vehicle body front.

Thus, the rear end edge portion at the hood rear portion of the at least one open portion formed in the inner member is set on an arcuate line where a vehicle width-direction center portion thereof is convex towards the vehicle body front. Thus, when a collision body collides with the vehicle width-direction center portion of the rear portion region of the hood, the rear end edge portion of the open portion formed in the inner member approaches lines joining the impact position of the collision body on the hood with both vehicle width-direction end portions of the hood rear end. Thus, immediately after the collision, the rear portion of the hood including the inner member can be made to sink towards the vehicle body bottom together with the collision body. For this reason, when a collision body collides with the rear portion region of the hood, an unnecessary forward G can be reduced, and the energy absorbing effect with respect to the collision body can be improved.

A thirteenth aspect of the invention provides a vehicular hood structure comprising an outer member configuring a vehicle body outer side surface of a hood and an inner member disposed at the inner side of the outer member, wherein the vehicular hood structure includes a front end portion inner member configuring a front end portion of the inner member, a rear end portion inner member configuring a rear end portion of the inner member, a plurality of front-rear direction inner members that are disposed along the vehicle body front-rear direction between the front end portion inner member and the rear end portion inner member and which bridge the front end portion inner member and the rear end portion inner member, at least one open portion formed in the inner member, and at least one reinforcement member disposed along the vehicle body front-rear direction at a rear end edge portion of the open portion at a hood rear portion at interval with the plurality of front-rear direction inner members between the plurality of front-rear direction inner members.

Thus, because at least one reinforcement member (preferably, reinforcement members) is disposed along the vehicle body front-rear direction at the rear end edge portion of the open portion at the hood rear portion at intervals with the left and right front-rear direction inner members, when a collision body collides with the hood, the generated load of the rear portion region of the hood can be increased virtually without increasing the generated load at the front portion region of the hood. As a result, when a collision body collides with the rear portion region of the hood, the energy absorbing effect with respect to the collision body can be improved.

A fourteenth aspect of the invention provides a vehicle body front portion structure comprising: a vehicular hood comprising a hood outer member configuring a vehicle body outer side surface and a hood inner member that is disposed at the inner side of the outer member and includes at least one open portion; and a front bumper, wherein at a side cross-section of all positions in the vehicle width direction of the vehicle body front portion, the length from a terminal end site of the front bumper to a front end edge portion of the open portion is substantially constant.

Thus, at the side cross-section of all positions in the vehicle width direction of the vehicle body front portion, the length from the terminal end site of the front bumper to the front end edge portion of the open portion of the inner member that is disposed at the inner side of the outer member of the vehicular hood and includes at least one open portion is substantially constant. Thus, even when a vertically long collision body hits any position in the vehicle width direction of the front bumper, the length between the position on the hood upper surface at which the uppermost portion of the collision body hits and the front end edge portion of the open portion can be made substantially uniform. As a result, when a collision body collides with the front portion region of the hood, the collision load on the collision body can be made uniform regardless of differences in the vehicle width direction of the collision position.

A fifteenth aspect of the invention provides the vehicle body front portion structure of the fourteenth aspect, wherein the length from the terminal end site of the front bumper to the front end edge portion of the open portion is a line length of an arcuate curved line along the outer contour of the vehicle body.

Thus, at the side cross-section of all positions in the vehicle width direction of the vehicle body front portion, the length from the terminal end site of the front bumper to the front end edge portion of the open portion of the inner member that is disposed at the inner side of the outer member of the vehicular hood and includes at least one open portion is a line length of an arcuate curved line along the outer contour of the vehicle body and is substantially constant. Thus, even when a vertically long collision body hits a position in the vehicle width direction of the front bumper, the length between the position on the hood upper surface at which the uppermost portion of the collision body hits and the front end edge portion of the open portion can be made substantially uniform. As a result, when a collision body collides with the front portion region of the hood, the collision load on the collision body can be made uniform regardless of differences in the vehicle width direction of the collision position.

A sixteenth aspect of the invention provides a vehicular hood structure comprising an outer member configuring a vehicle body outer side surface of a hood and an inner member disposed at the inner side of the outer member, wherein the vehicular hood structure includes a front end portion inner member configuring a front end portion of the inner member, a rear end portion inner member configuring a rear end portion of the inner member, front-rear direction inner side members that are disposed along the vehicle body front-rear direction between the front end portion inner member and the rear end portion inner member at sides portions and which bridge the front end portion inner member and the rear end portion inner member, and at least one front-rear direction inner center member that is disposed along the vehicle body front-rear direction between the front end portion inner member and the rear end portion inner member and which bridges the front end portion inner member and the rear end portion inner member.

A seventeenth aspect of the invention provides the vehicular hood structure of the eighth aspect, wherein at a coupling portion of the front-rear direction inner member, the front-rear direction inner member is coupled via another member.

An eighteenth aspect of the invention provides the vehicular hood structure of the thirteenth aspect, wherein the at least one reinforcement member is formed integrally with the rear end portion inner member.

BRIEF DESCRIPTION OF THE DRAWINGS

FIG. 18A is a perspective view, seen from diagonally above the vehicle body front, showing a vehicle width-direction center front end portion of a vehicular hood structure pertaining to a modified example of the second embodiment of the invention, and FIG. 18B is a perspective view, seen from diagonally above the vehicle body front, showing a vehicle width-direction center front end portion of a vehicular hood structure pertaining to a modified example of the second embodiment of the invention;

FIG. 19A is a cross-sectional view along line 19—19 of FIG. 18A, and FIG. 19B is a cross-sectional view along line 19—19 of FIG. 18B;

FIG. 31 is an enlarged cross-sectional view along line 3—3 of FIG. 1 showing a vehicle body front portion structure pertaining to a fifth embodiment of the invention.

DETAILED DESCRIPTION OF THE INVENTION

Figure 1:
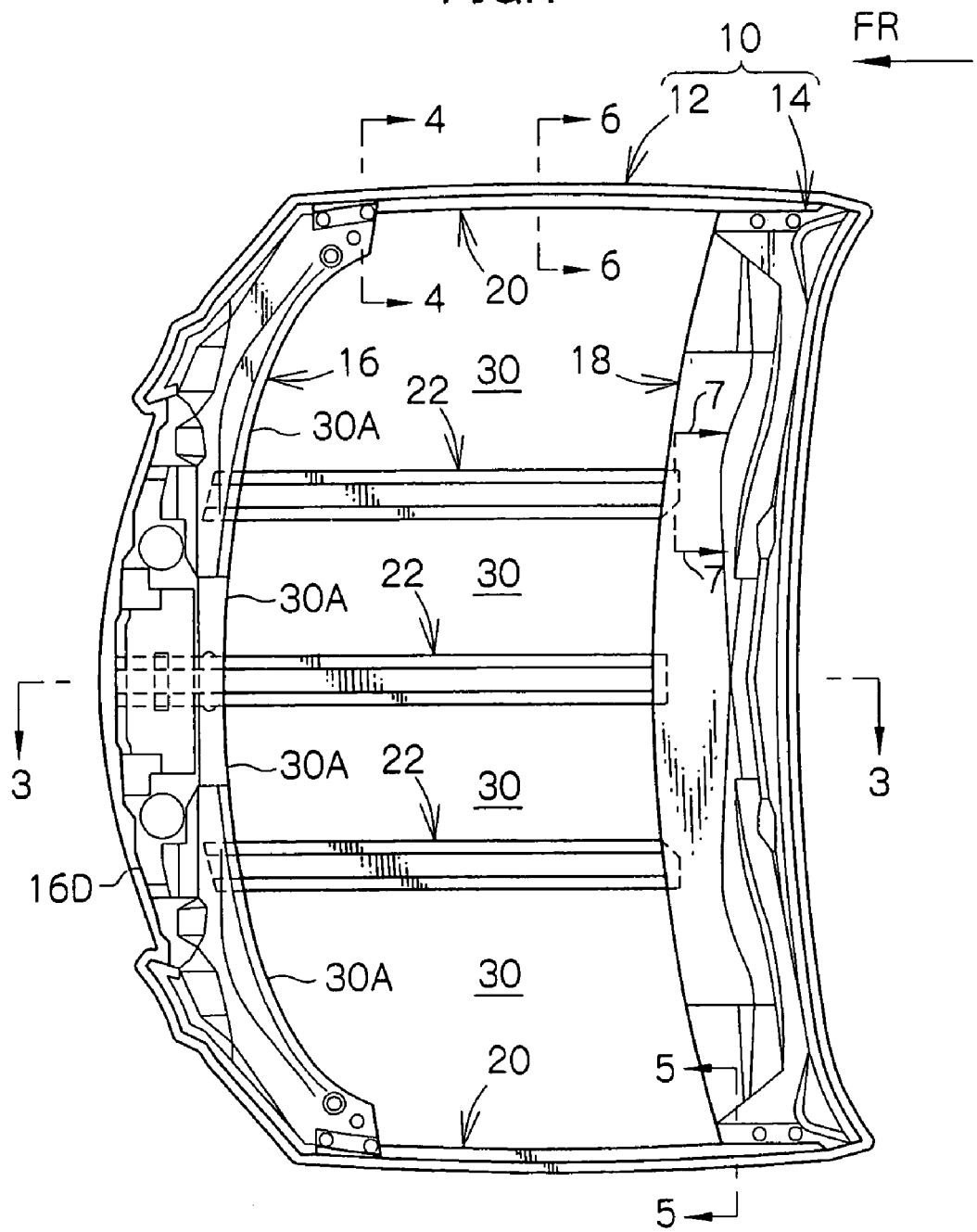
FIG. 1 is a schematic plan view, seen from below a vehicle body, showing a vehicular hood structure pertaining to a first embodiment of the invention.

A first embodiment of a vehicular hood structure of the invention will be described in accordance with FIGS. 1 to 7.

In the drawings, the IN arrow represents a vehicle width inner side direction, the UP arrow represents a vehicle body up direction, and the FR arrow represents a vehicle body front direction.

Figure 3:
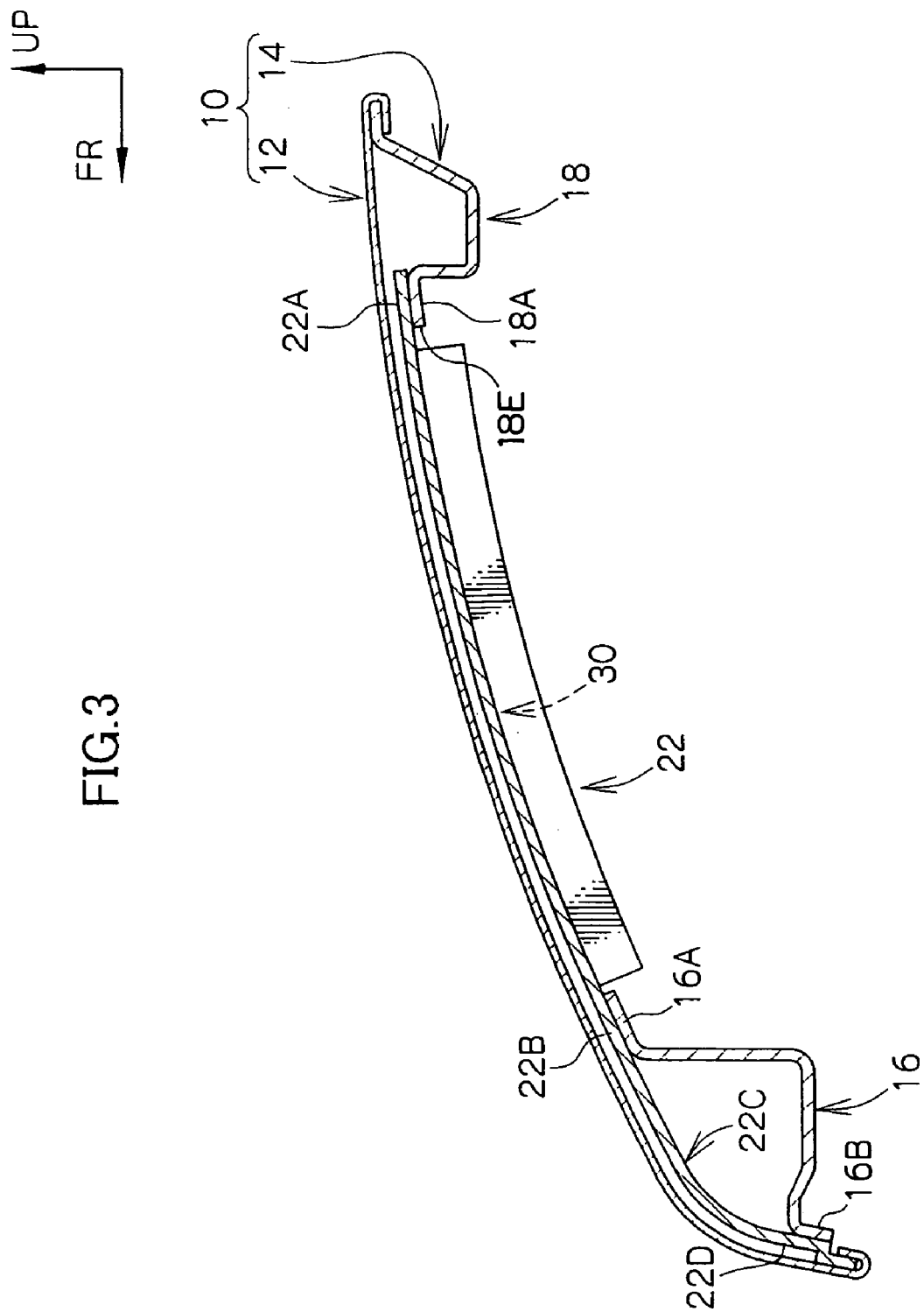
FIG. 3 is an enlarged cross-sectional view along line 3—3 of FIG. 1.

As shown in FIG. 3, in the present embodiment, an automobile hood 10 is configured by an outer panel 12, which serves as an outer member configuring a vehicle body outer side surface of the hood 10, and an inner panel 14, which is disposed at the inner side of the outer panel 12 and configures an engine room side portion.

Figure 2:
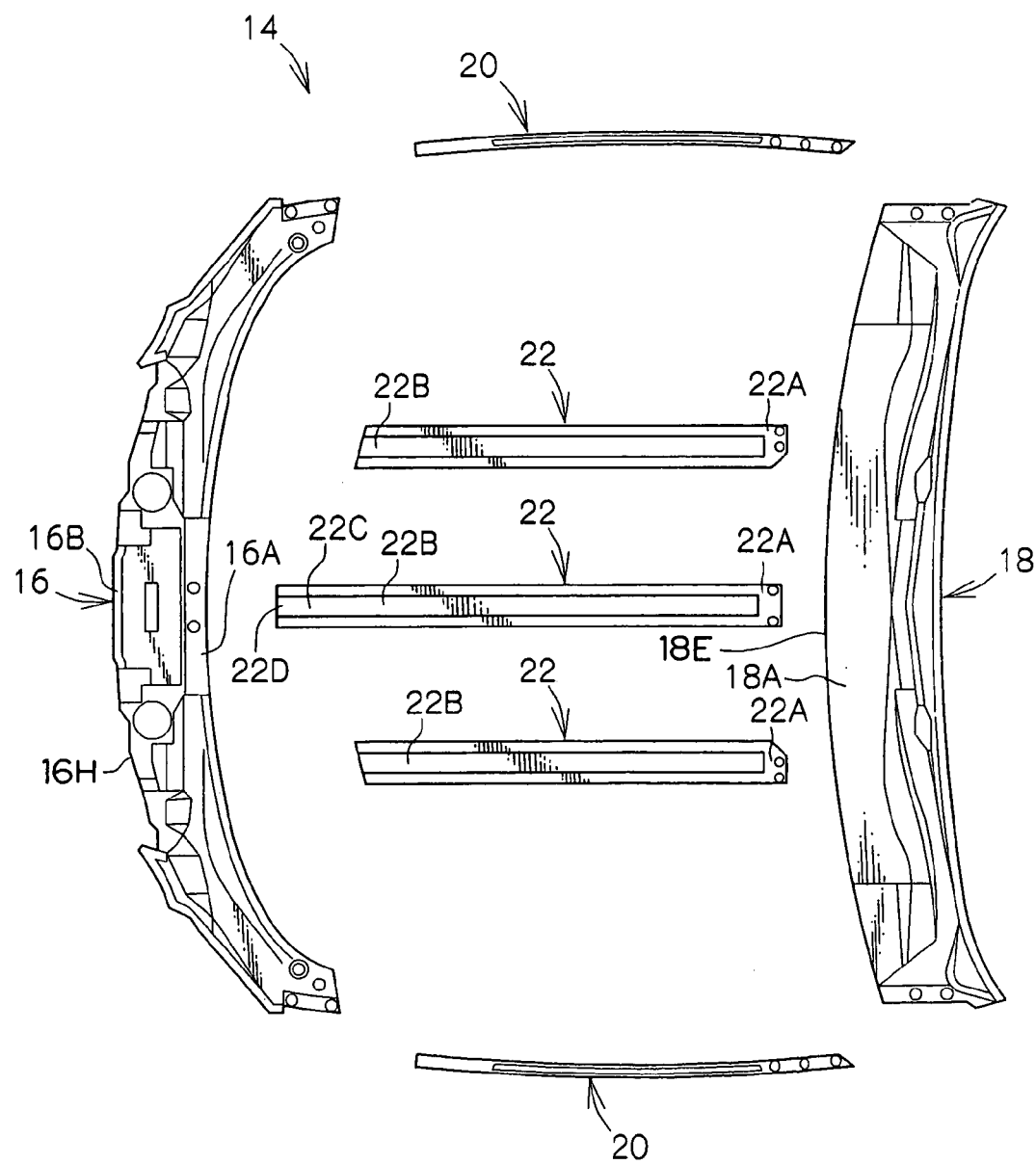
FIG. 2 is an exploded plan view, seen from below the vehicle body, showing an inner panel of the vehicular hood structure pertaining to the first embodiment of the invention.

As shown in FIG. 2, the inner panel 14 of the hood 10 is configured by an inner front 16 that configures a front end portion of the inner panel 14, an inner rear 18 that configures a rear end portion of the inner panel 14, inner sides 20 serving as front-rear direction inner members configuring both vehicle width-direction end portions of the inner panel 14, and three inner centers 22 that are disposed between the left and right inner sides 20 in the vehicle front-rear direction and serve as front-rear direction inner members that bridge the inner front 16 and the inner rear 18.

As shown in FIG. 3, rear end portions 22A of the three inner centers 22 are joined to an upper surface of a front flange 18A of the inner rear 18, and front end portions 22B of the three inner centers 22 are joined to an upper surface of a rear flange 16A of the inner front 16. An extension portion 22C is formed at the inner center 22 disposed in the vehicle width-direction center and extends from the front end portion 22B downward towards the vehicle body front side. A front end edge portion 22D of the extension portion 22C is joined to a front surface of a front flange 16B of the inner front 16.

Thus, the inner centers 22 and the inner front 16 are joined from a substantial vehicle body vertical direction at the portions where the front end portions 22B and the rear flange 16A are joined, and are also joined from a substantial vehicle body vertical direction at the portion where the front end edge portion 22D and the front flange 16B are joined. As a result, when a load in a separation direction acts on the portions where the front end portions 22B and the rear end flange 16A are joined, a load in a shearing direction acts on the portion where the front end edge portion 22D and the front flange 16B are joined.

As shown in FIG. 1, four open portions 30 that extend in the vehicle body front-rear direction are formed in the inner panel 14 by the linear left right inner sides 20 and the three inner centers 22 disposed in parallel along the vehicle body front-rear direction.

Figure 4:
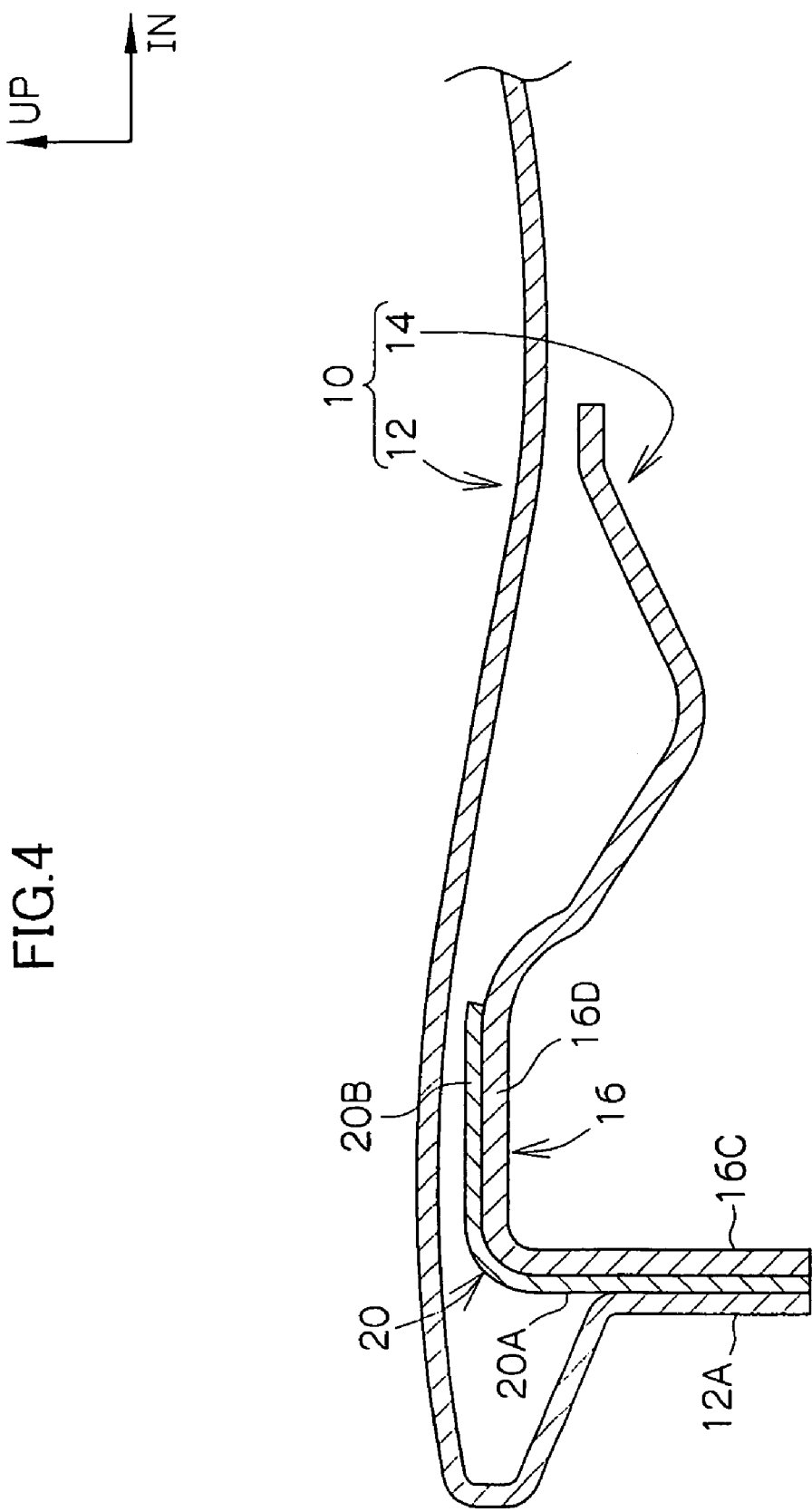
FIG. 4 is an enlarged cross-sectional view along line 4—4 of FIG. 1.

As shown in FIG. 4, side wall portions 16C of the inner front 16 are joined to vehicle width-direction inner side surfaces of side wall portions 20A of the inner sides 20 at the portions where the inner front 16 and the inner sides 20 are joined, and upper wall portions 16D of the inner fronts 16 are joined to lower surfaces of upper wall portions 20B of the inner sides 20.

Thus, the inner sides 20 and the inner front 16 are joined from a substantial vehicle-width direction at the portions where the side wall portions 20A and the side wall portions 16C are joined, and are also joined from a substantial vehicle-width direction at the portions where the upper wall portions 20B and the upper wall portions 16D are joined. As a result, when a load in the separation direction acts on the portions where the side wall portions 20A and the side wall portions 16C are joined, a load in the shearing direction acts on the portions where the upper wall portions 20B and the upper wall portions 16D are joined.

Also, side wall portions 12A of the outer panel 12 are joined to vehicle width-direction outer side surfaces of the side wall portions 20A of the inner sides 20.

Figure 5:
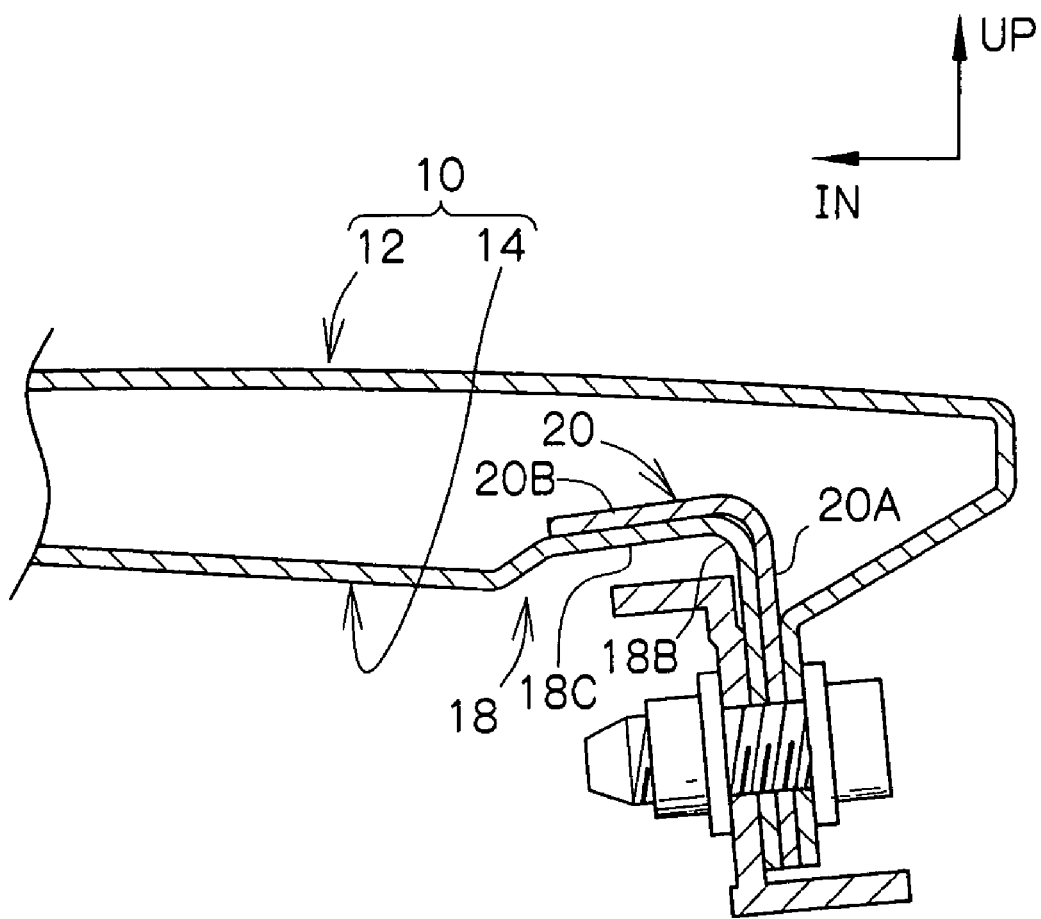
FIG. 5 is an enlarged cross-sectional view along line 5—5 of FIG. 1.

As shown in FIG. 5, side wall portions 18B of the inner rear 18 are joined to vehicle width-direction inner side surfaces of the side wall portions 20A of the inner sides 20 at the portions where the inner rear 18 and the inner sides 20 are joined, and upper wall portions 18C of the inner rear 18 are joined to the lower surfaces of the upper wall portions 20B of the inner sides 20 at the portions where the inner rear 18 and the inner sides 20 are joined.

Thus, the inner sides 20 and the inner rear 18 are joined from a substantial vehicle-width direction at the portions where the side wall portions 20A and the side wall portions 18B are joined, and are also joined from a substantial vehicle-width direction at the portions where the upper wall portions 20B and the upper wall portions 18C are joined. As a result, when a load in the separation direction acts on the portions where the side wall portions 20A and the side wall portions 18B are joined, a load in the shearing direction acts on the portions where the upper wall portions 20B and the upper wall portions 18C are joined.

Figure 6:
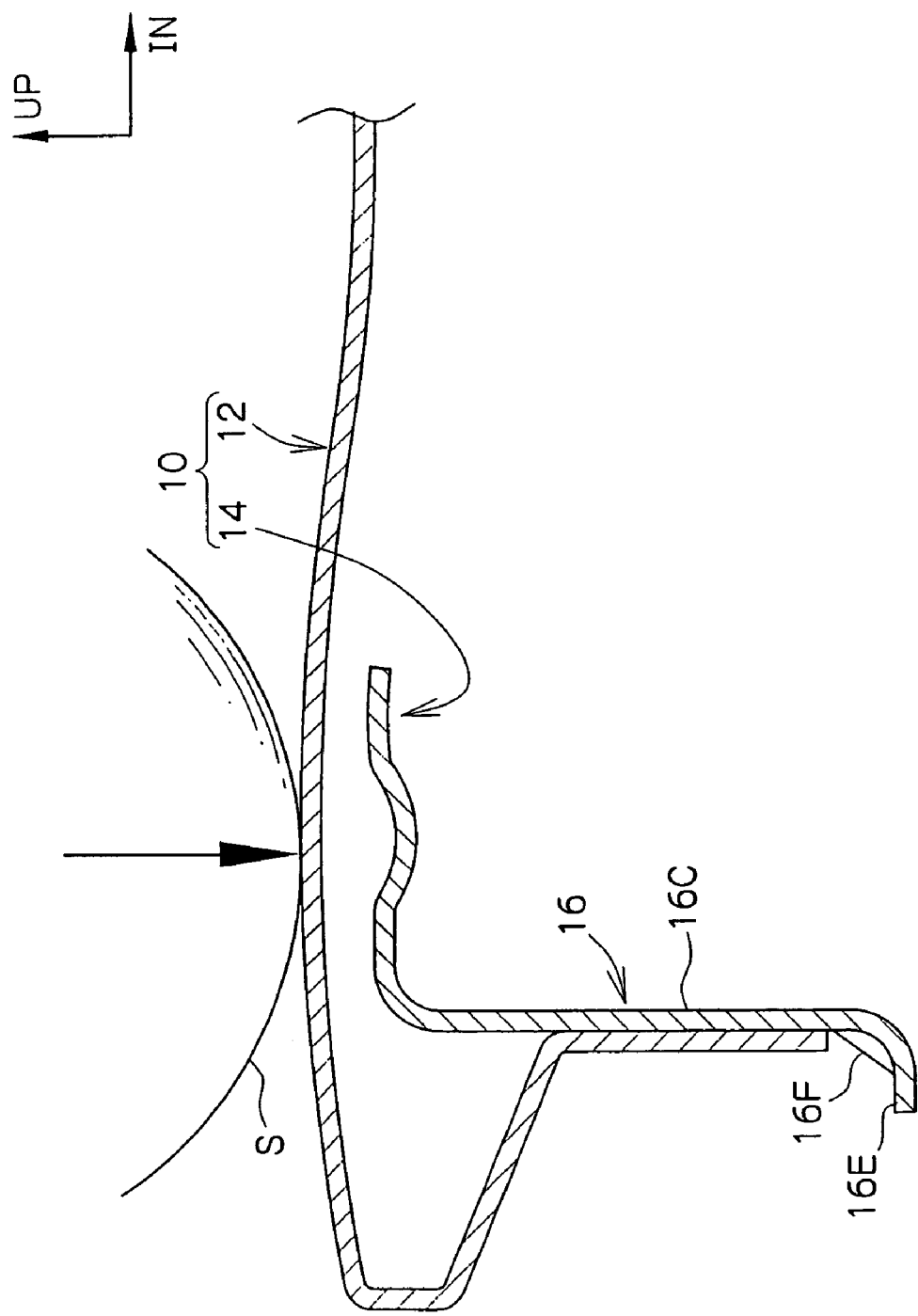
FIG. 6 is an enlarged cross-sectional view along line 6—6 of FIG. 1.

As shown in FIG. 6, flanges 16E are formed towards the vehicle width-direction outer sides at the lower end portions of the side wall portions 16C of the inner front 16, and a positioning-use convex portion 16F is formed at the bases of the flanges 16E. It should be noted that reference letter S in FIG. 6 represents a collision body.

Figure 7:
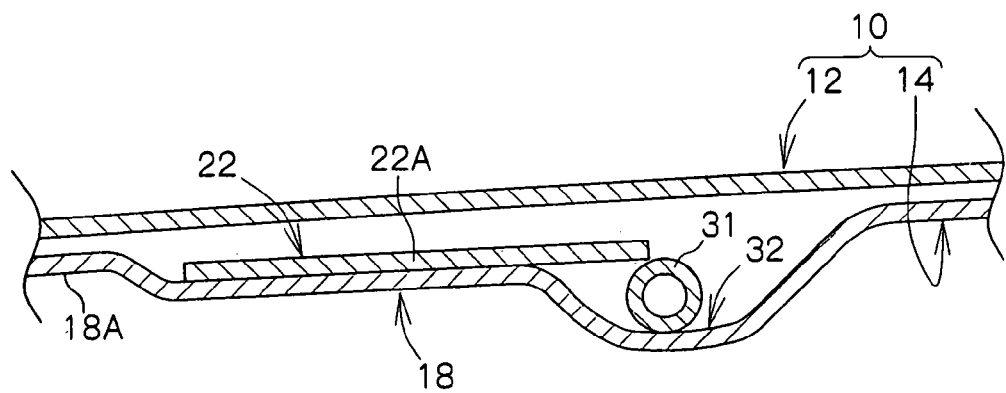
FIG. 7 is an enlarged cross-sectional view along line 7—7 of FIG. 1.

As shown in FIG. 7, a recess 32 for passing a washer hose 31 is formed in the front flange 18A serving as the front portion of the inner rear 18. The recess 32 is partially (the state shown in FIG. 7) or completely (not shown) closed off by the rear end portions 22A of the inner centers 22.

Thus, when a collision body collides with a site above the recess 32 in the hood 10, an elastic deformation mode resulting from the recess 32 can be eliminated by the rear end portions 22A of the inner centers 22, whereby the generation of a reaction force can be promptly launched. This is also efficient in terms of the production process in comparison to a structure where a hole is formed in the inner rear 18 and the washer hose 31 is passed through this hole.

Next, the operation of the present embodiment will be described.

In the present embodiment, the inner panel 14 of the hood 10 has a divided structure configured by the inner front 16, the inner rear 18, the inner sides 20 and the inner centers 22. Thus, the inner panel 14 can be divided into plural long parts. As a result, progressive molding becomes possible and production yield increases. For this reason, material costs, mold costs and processing costs can be reduced, and it becomes possible to reduce production costs. Also, because the inner panel 14 can be transported and stored in a state where the inner panel 14 is divided, transport and storage of the inner panel 14 become easy.

Also, in the present embodiment, as shown in FIG. 3, the inner centers 22 and the inner front 16 are joined from a substantial vehicle body vertical direction at the portions where the front end portions 22B and the rear flange 16A are joined, and are also joined from a substantial vehicle body front-rear direction at the portion where the front end edge portion 22D and the front flange 16B are joined. Also, as shown in FIG. 4, the inner sides 20 and the inner front 16 are joined from a substantial vehicle width-direction at the portions where the side wall portions 20A and the side wall portions 16C are joined, and are also joined from a substantial vehicle body vertical direction at the portions where the upper wall portions 20B and the upper wall portions 16D are joined. Moreover, as shown in FIG. 5, the inner sides 20 and the inner rear 18 are joined from a substantial vehicle width-direction at the portions where the side wall portions 20A and the side wall portions 18B are joined, and are also joined from a substantial vehicle body vertical direction at the portions where the upper wall portions 20B and the upper wall portions 18C are joined. As a result, the respective coupling strengths of the divided inner front 16, the inner rear 18, the inner sides 20 and the inner centers 22 are improved with respect to both the separation direction and the shearing direction. For this reason, a sufficient bonding strength is obtained even at joints resulting from adhesion, and the torsional rigidity of the inner panel 14 can be sufficiently secured.

Also, in the present embodiment, as shown in FIG. 1, the inner sides 20 and the inner centers 22 have a dual beam structure disposed along the vehicle body front-rear direction between the inner front 16 and the inner rear 18. As a result, when a collision body collides with the hood 10, deformation of the hood 10 for absorbing the impact is smoothly carried out and a reaction force in the vehicle body front-rear direction is not generated, whereby the impact absorbing efficiency can be improved. Also, the timing of the load generation when a collision body has collided with the hood 10 can be quickened.

Next, a second embodiment of the vehicular hood structure of the invention will be described in accordance with FIGS. 8 to 15.

It should be noted that identical reference numerals will be given to members that are the same as those of the first embodiment, and that description of those members will be omitted.

Figure 8:
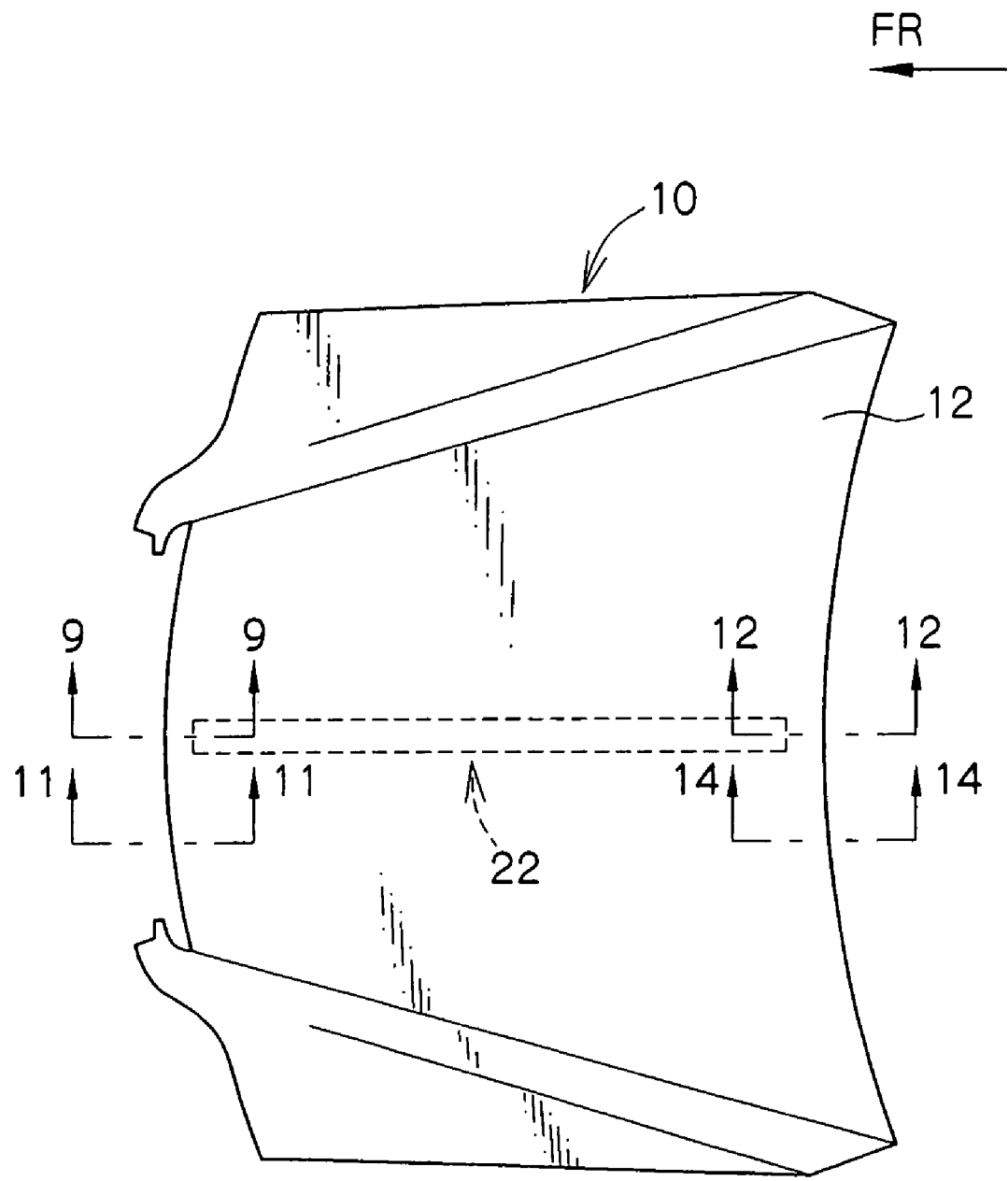
FIG. 8 is a plan view showing a vehicular hood structure pertaining to a second embodiment of the invention.

As shown in FIG. 8, in the present embodiment, one inner center 22 is disposed in the vehicle width-direction center portion of the hood.

Figure 9:
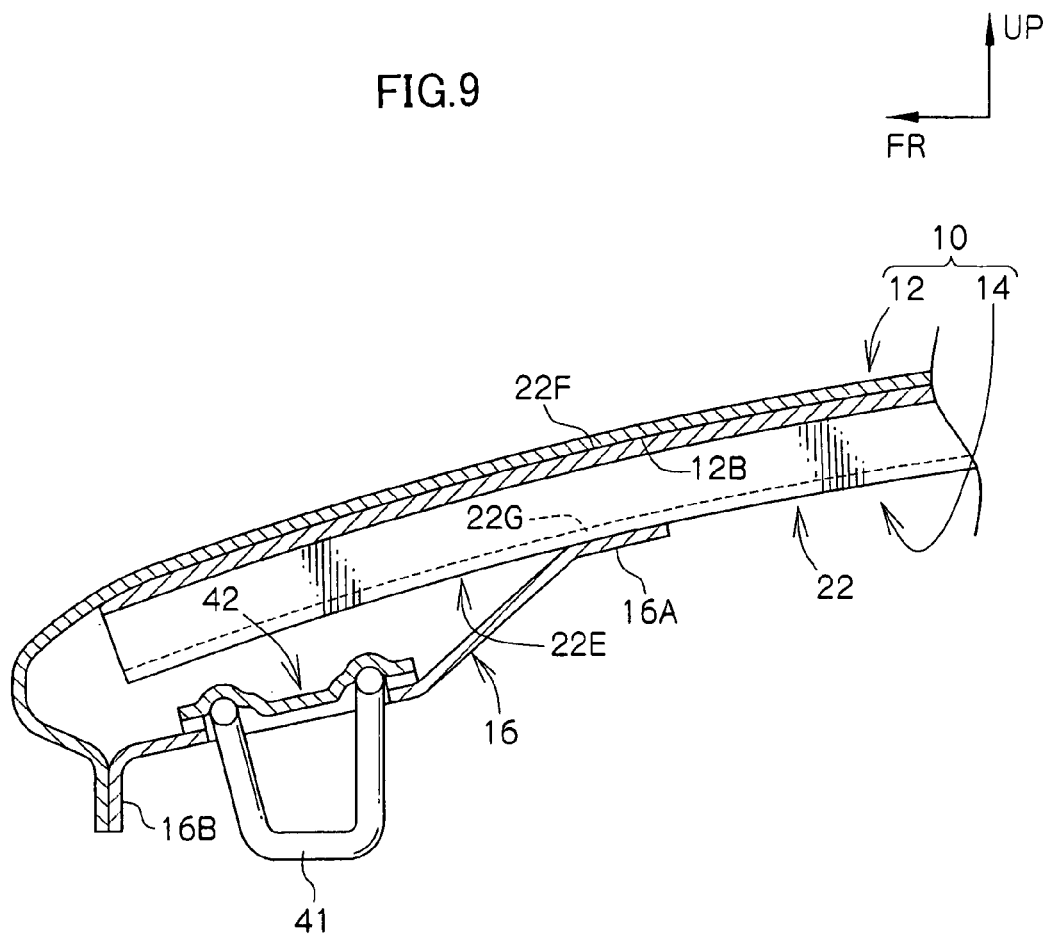
FIG. 9 is an enlarged cross-sectional view along line 9—9 of FIG. 8.

As shown in FIG. 9, a front end portion 22E of the inner center 22 of the present embodiment extends towards the vehicle body front from the rear flange 16A of the inner front 16, and extends as far as above a hood lock reinforcement 42 disposed above a hood lock or a hood stopper. Also, an upper surface 22F of the inner center 22 opposing the outer panel 12 has a shape that is flatly smooth and is along an undersurface 12B of the outer panel 12, and the upper surface 22F of the inner center 22 is joined by adhesion or welding to the undersurface 12B of the outer panel 12. Reference numeral 41 in FIG. 9 represents a hood lock striker.

Figure 10:
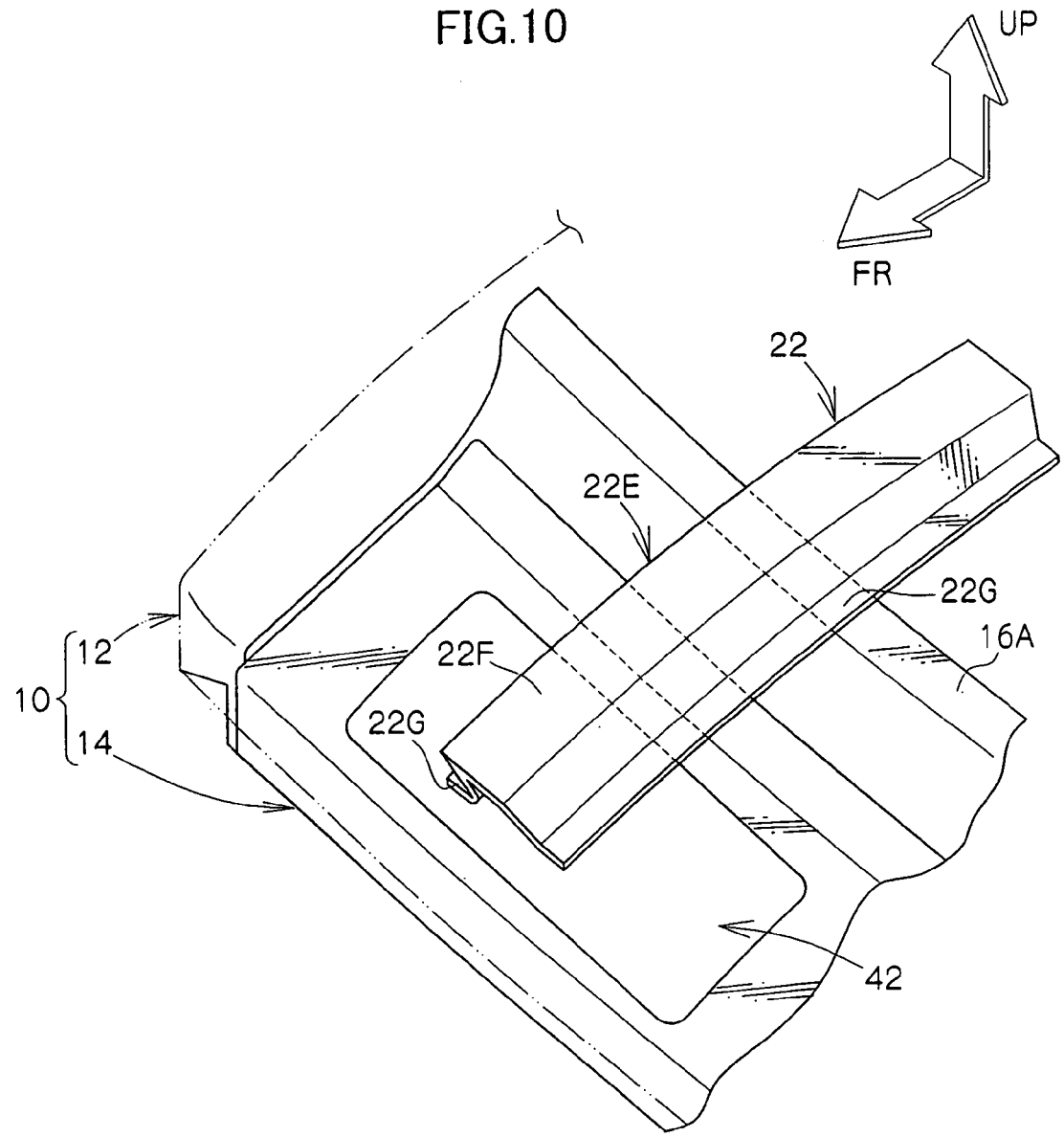
FIG. 10 is a perspective view, seen from diagonally above the vehicle body front, showing a vehicle width-direction center front end portion of the vehicular hood structure pertaining to the second embodiment of the invention.

As shown in FIG. 10, the cross-sectional shape of the inner center 22 seen from the vehicle body front-rear direction is a hat shape where the open portion is oriented towards the vehicle body bottom, and left and right flanges 22G formed at the open end portion are joined to the rear flange 16A of the inner front 16.

Figure 11:
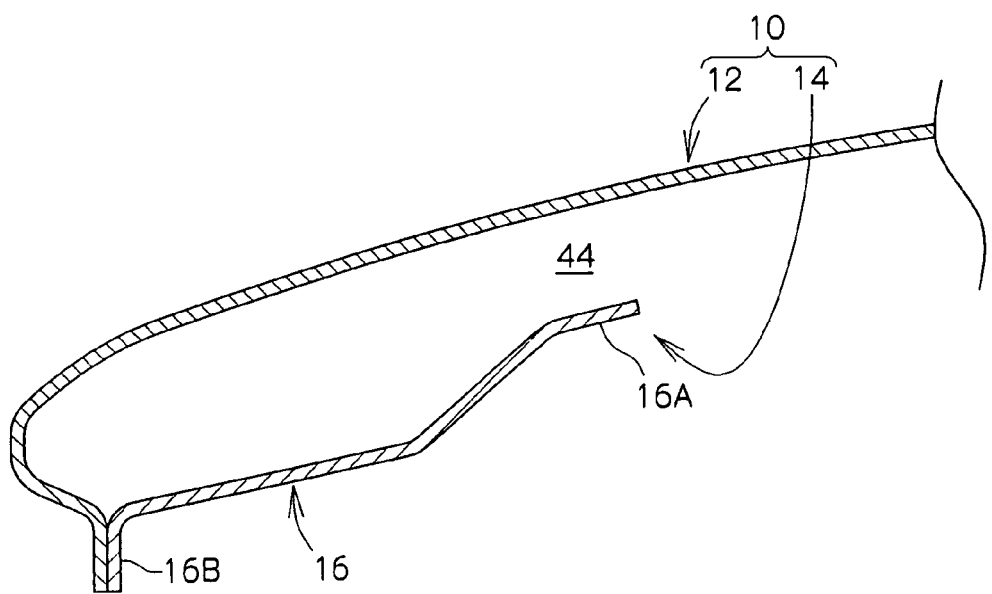
FIG. 11 is an enlarged cross-sectional view along line 11—11 of FIG. 8.

As shown in FIG. 11, a gap 44 is formed between the outer panel 12 and the rear flange 16A of the inner front 16 at a site where the inner center 22 of the hood 10 is not present.

Figure 12:
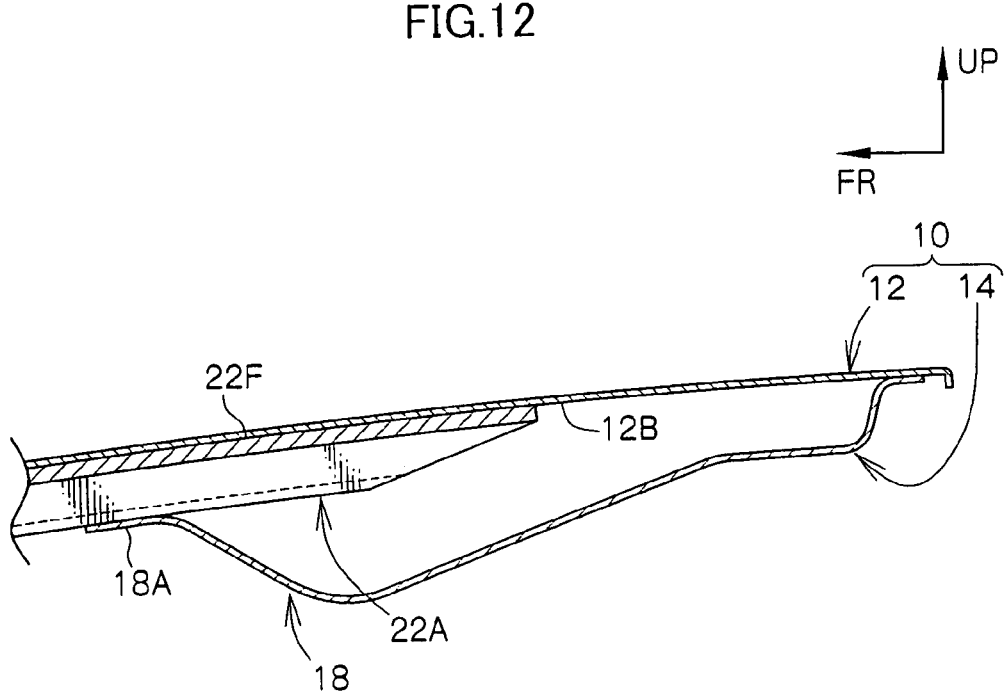
FIG. 12 is an enlarged cross-sectional view along line 12—12 of FIG. 8.

As shown in FIG. 12, the rear end portion 22A of the inner center 22 extends towards the vehicle body rear from the front flange 18A of the inner rear 18, and the upper surface 22F of the inner center 22 is joined by adhesion or welding to the undersurface 12B of the outer panel 12.

Figure 13:
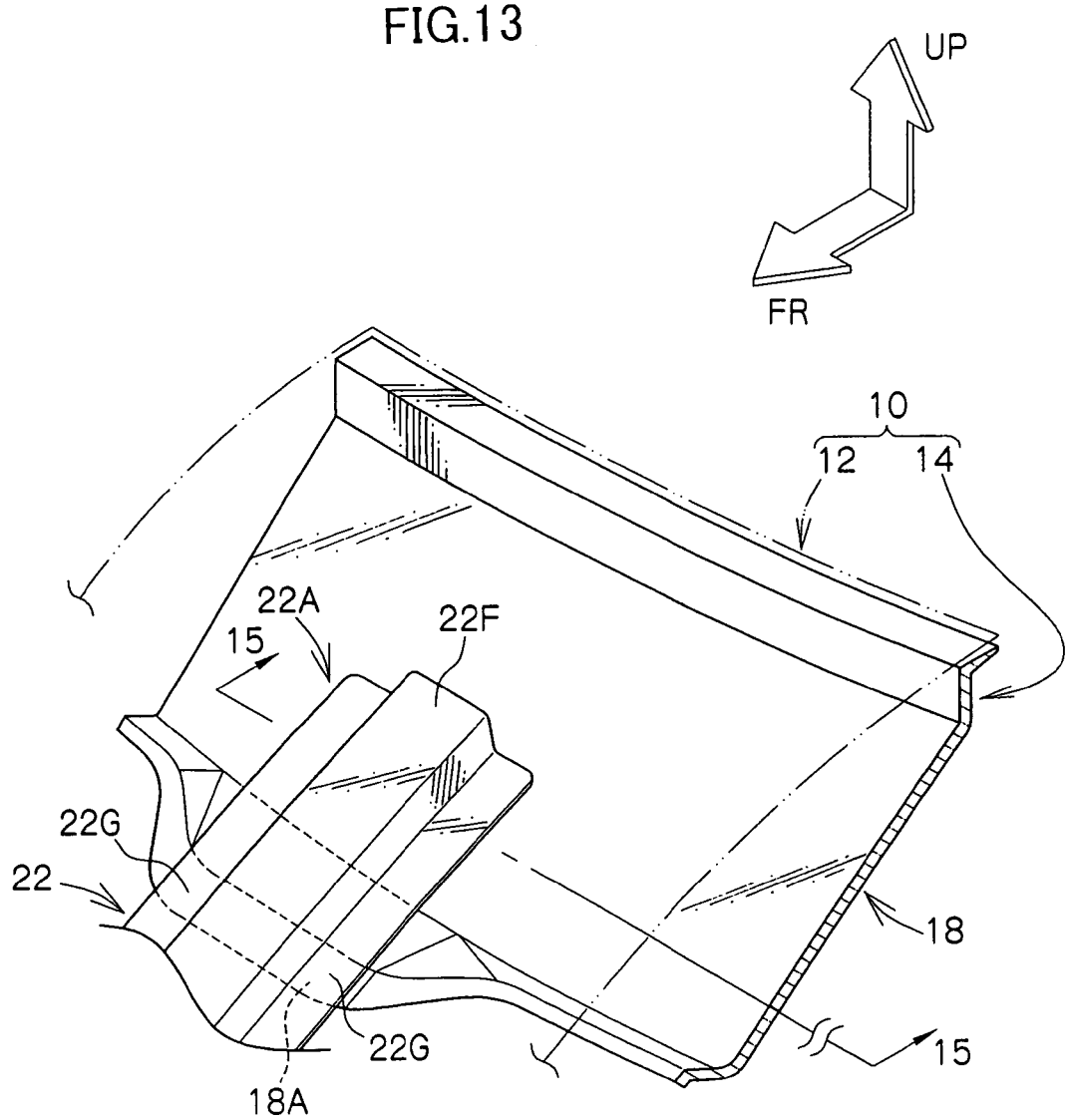
FIG. 13 is a perspective view, seen from diagonally above the vehicle body front, showing a vehicle width-direction center rear end portion of the vehicular hood structure pertaining to the second embodiment of the invention.

As shown in FIG. 13, the left and right flanges 22G of the inner center 22 are joined to the front flange 18A of the inner rear 18.

Figure 14:
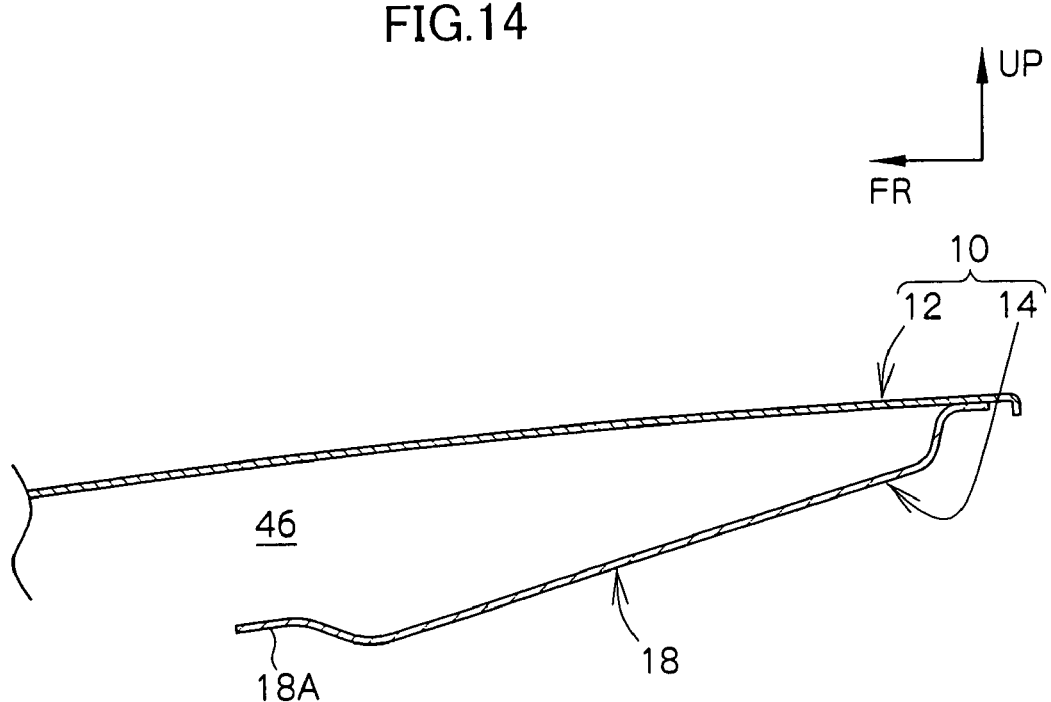
FIG. 14 is an enlarged cross-sectional view along line 14—14 of FIG. 8.

As shown in FIG. 14, a gap 46 is formed between the outer panel 12 and the front flange 18A of the inner rear 18 at a site where the inner center 22 of the hood 10 is not present.

Next, the operation of the present embodiment will be described.

In the present embodiment, in addition to the operation and effects of the first embodiment, the front end portion 22E of the inner center 22 extends towards the vehicle body front from the rear flange 16A of the inner front 16, and the rear end portion 22A of the inner center 22 extends towards the vehicle body rear from the front flange 18A of the inner rear 18. Also, the upper surface 22F of the inner center 22 opposing the outer panel 12 has a shape that is flatly smooth and is along the undersurface 12B of the outer panel 12, and the upper surface 22F of the inner center 22 is joined by adhesion or welding to the undersurface 12B of the outer panel 12.

As a result, the cross section of the upper surface 22F of the inner center 22 can be made flatly smooth in the vicinity of the front end portion and in the vicinity of the rear end portion of the hood 10, and the potential to generate an unnecessary deceleration load in the front-rear direction with respect to a collision body at the time of a collision with a collision body can be reduced.

Also, in the present embodiment, the front end portion 22E of the inner center 22 extends as far as above the hood lock reinforcement 42. Namely, the inner center 22, which generates an excellent collision acceleration, is disposed above the hood lock reinforcement 42. For this reason, an excellent collision acceleration can be generated even at a position above the hood lock reinforcement 42, at which control of the collision load has conventionally been difficult. Moreover, the rigidity of the hood 10 in a case where the site directly above the hood lock reinforcement 42 is pressed can be improved.

Also, in the present embodiment, as shown in FIG. 11, the gap 44 is formed between the outer panel 12 and the rear flange 16A of the inner front 16 at a site where the inner center 22 is not present at the hood 10, and as shown in FIG. 14, the gap 46 is formed between the outer panel 12 and the front flange 18A of the inner rear 18 at a site where the inner center 22 is not present at the hood 10. As a result, when a collision body collides with a site where the inner center 22 of the hood 10 is not present, generation of an unnecessary collision acceleration can be prevented, and a secondary collision acceleration can be reduced. Moreover, it becomes easy for a rust-preventing coating to enter between the outer panel 12 and the inner front 16 or the inner rear 18, so that the rust-preventing performance is improved.

Figure 15:
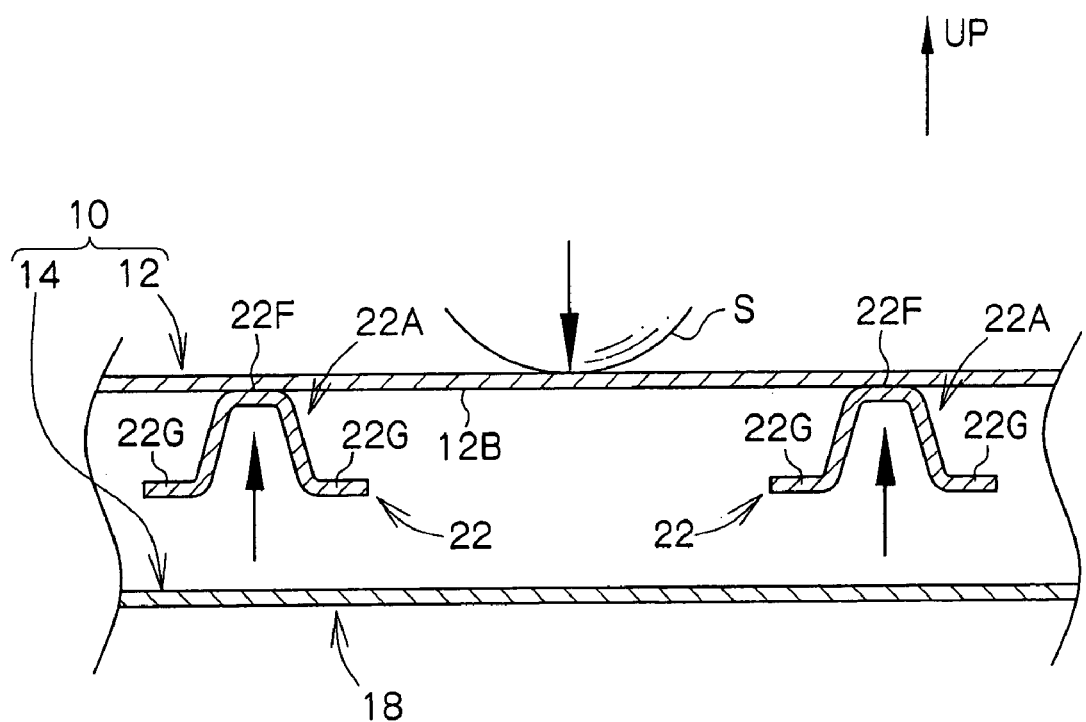
FIG. 15 is an enlarged cross-sectional view along line 15—15 of FIG. 13.

Also, in the embodiment and a modified embodiment thereof as shown in FIG. 15 in which plural inner centers 22 are provided, even when a collision body S collides with the hood 10 between adjacent inner centers 22 at the site of the outer panel 12 opposing the inner rear 18, deformation of the outer panel 12 can be suppressed by the adjacent inner centers 22. As a result, the outer panel 12 can be prevented from abutting against the inner rear 18 to prevent an unnecessary acceleration from being generated.

Figure 16:
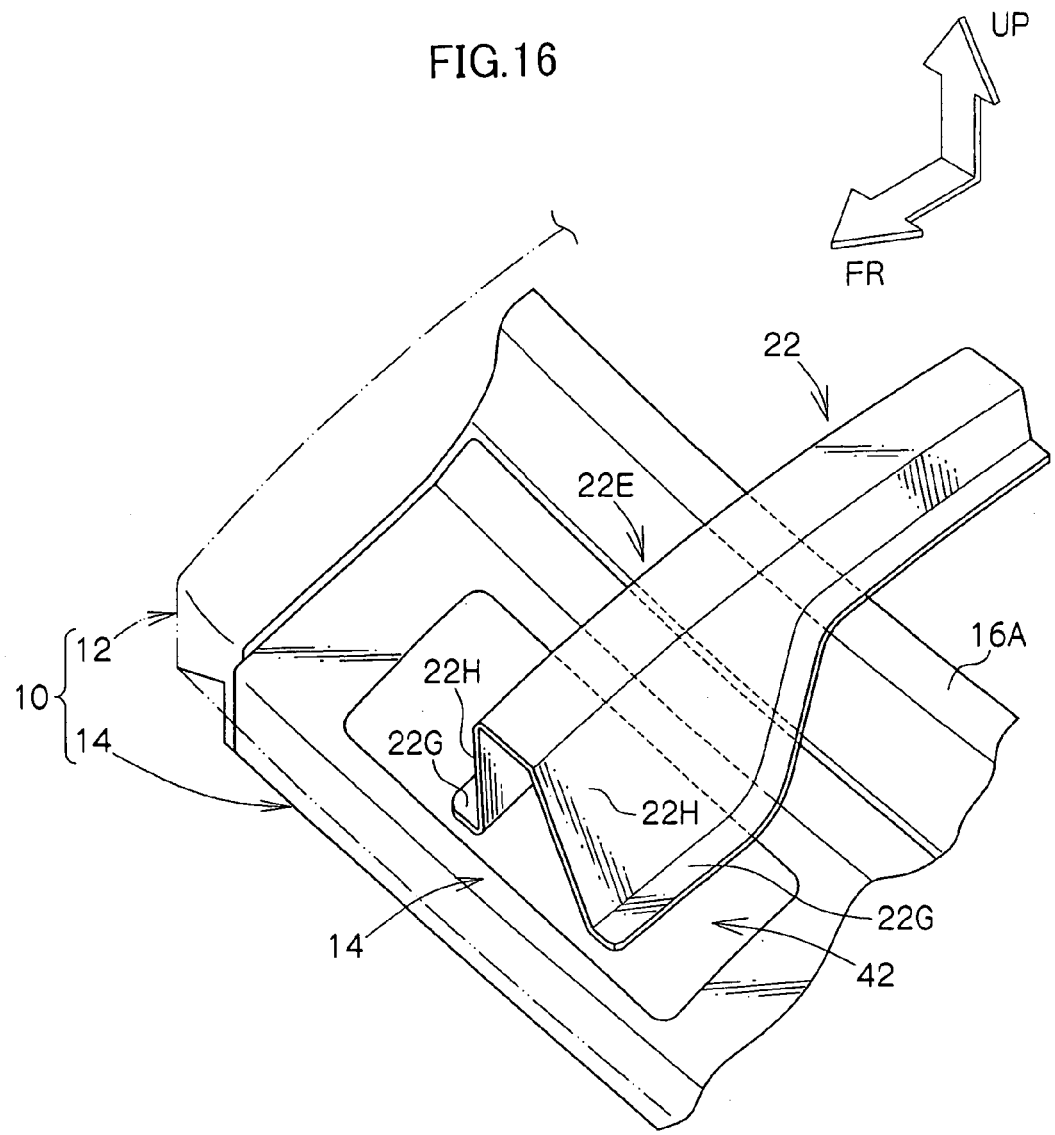
FIG. 16 is a perspective view, seen from diagonally above the vehicle body front, showing a vehicle width-direction center front end portion of a vehicular hood structure pertaining to a modified example of the second embodiment of the invention.

As shown in FIG. 16, both side wall portions 22H may extend downward at the front end portion 22E of the inner center 22, and the flanges 22G at the lower ends of both side wall portions may be joined by adhesion or welding to the inner panel 14 or the hood lock reinforcement 42. In this case, the inner panel 14 or the hood lock reinforcement 42 can be supported at both side wall portions 22H of the inner center 22. As a result, it becomes difficult for local deformation to occur at a collision portion when a collision body collides with the front portion of the hood 10, so that unnecessary acceleration in the front-rear direction can be reduced. Also, the rigidity in a case where the site of the hood 10 directly above the hood lock reinforcement 42 is pressed can be further improved.

Figure 17:
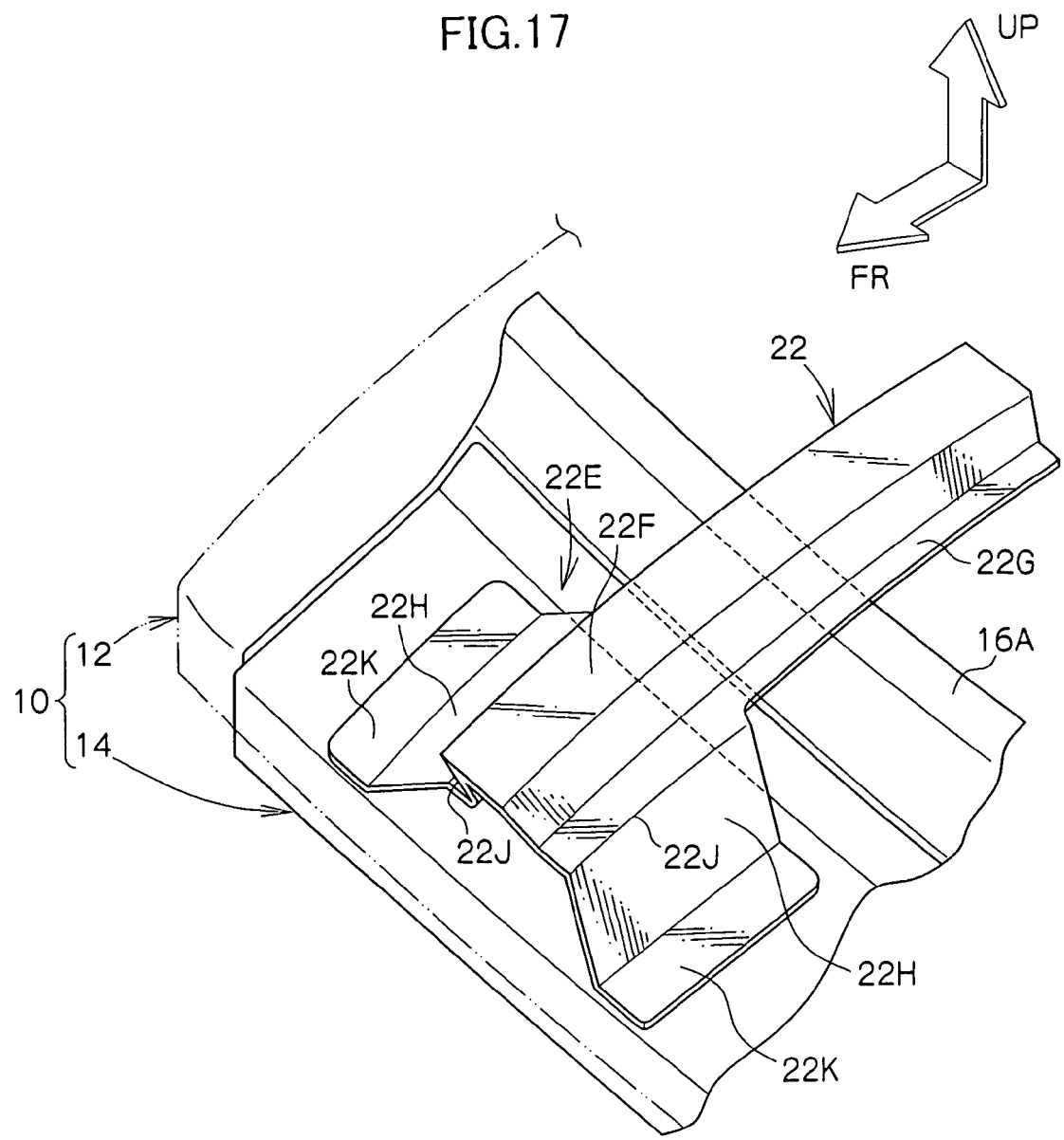
FIG. 17 is a perspective view, seen from diagonally above the vehicle body front, showing a vehicle width-direction center front end portion of a vehicular hood structure pertaining to a modified example of the second embodiment of the invention.

As shown in FIG. 17, fold lines 22J along the vehicle body front-rear direction may be formed in both side wall portions 22H at the front end portion 22E of the inner center 22, and joint portions 22K formed at the lower ends of both side wall portions 22H may be joined by adhesion or welding to the inner panel 14 or the hood lock reinforcement 42. In this case, the fold lines 22J can alleviate a second moment of area of the inner center 22 generated when a collision body collides with the hood 10 from suddenly changing at the sites where both side wall portions 22H of the inner center 22 are joined to the inner panel 14 or the hood lock reinforcement 42 and the sites rearward of these sites. As a result, the sites joined to the inner panel 14 or the hood lock reinforcement 42 are also deformed in the same manner as the collision portion at the frontward side of the collision portion when a collision body collides with the front portion of the hood 10. For this reason, unnecessary front-rear acceleration can be further reduced. Also, because both side wall portions 22H bend (curve) inward of the cross-sectional hat shape with the fold lines 22J as starting points, it becomes easy to control the load in a case where the site of the hood 10 directly above the hood lock reinforcement 42 is pressed.

Figure 20:
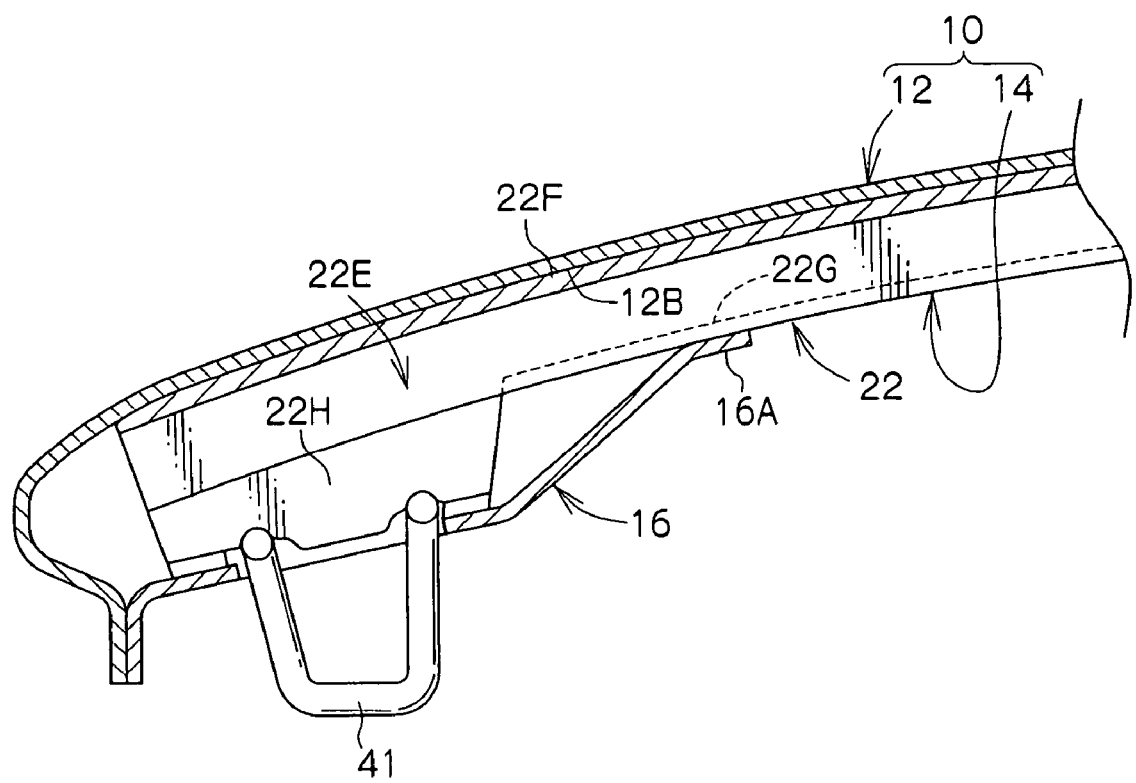
FIG. 20 is a cross-sectional view along line 20—20 of FIGS. 19A and 19B.
Figure 21:
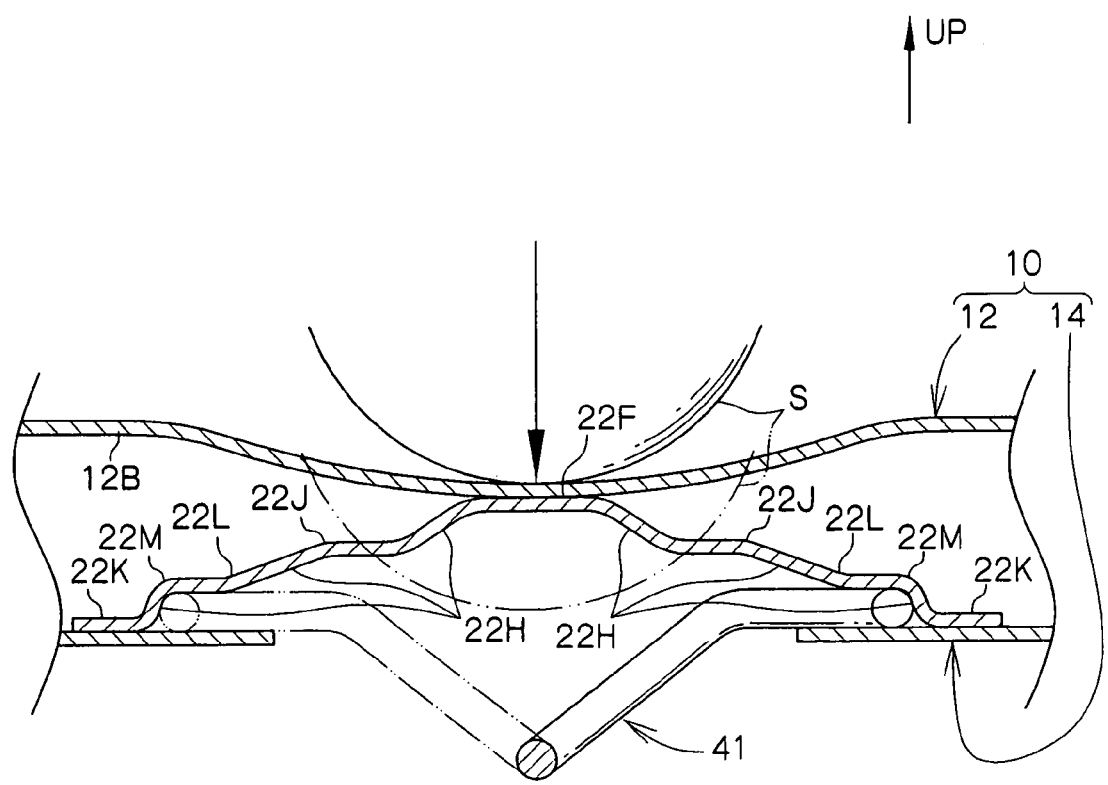
FIG. 21 is a cross-sectional view showing a deformed state of FIGS. 19A and 19B.

Also, as shown in FIGS. 18A, 19A and 20, the hood lock striker 41 may be directly joined to the front end portion 22E to eliminate the hood lock reinforcement. As a result, the portions where the inner center 22 is joined to the inner front 16 may be eliminated or the portions 22k where the inner center 22 is joined to the inner front 16 may be disposed as positions separated from the hood lock striker 41 as much as possible in the vehicle width direction, or fold lines 22L and 22M along the vehicle body front-rear direction may be formed in both side wall portions 22H, whereby movement of the hood lock striker 41 towards the vehicle width-direction outer sides is not obstructed. In this case, as shown in FIG. 21, when a collision body collides with the site of the hood 10 directly above the hood lock striker 41, the hood lock striker 41 also expands and is deformed in the vehicle width direction when both side wall portions 22H expand and are deformed in the vehicle width direction at the front end portion 22E of the inner center 22. As a result, it becomes easier for both side wall portions 22H to expand in the vehicle width direction at the front end portion 22E of the inner center 22. For this reason, a rise in acceleration can be controlled because the deformation stroke can be lengthened.

Also, by eliminating the hood stroke reinforcement, the number of parts can be reduced and the hood lock striker 41 can be pressed via the outer panel 12 and the inner center 22 of the hood 10, whereby the locking of the hood 10 becomes easy and reliable. For this reason, poor locking of the hood 10 can be prevented.

Also, as shown in FIGS. 18B and 19B, the front end portion 22E of the inner center 22 may be divided in two, and the leading end portions of the flanges 22G of the inner center 22 may be joined to an upper surface of an upper wall portion 22N formed between the left and right fold lines 22J of the separate member.

Figure 22:
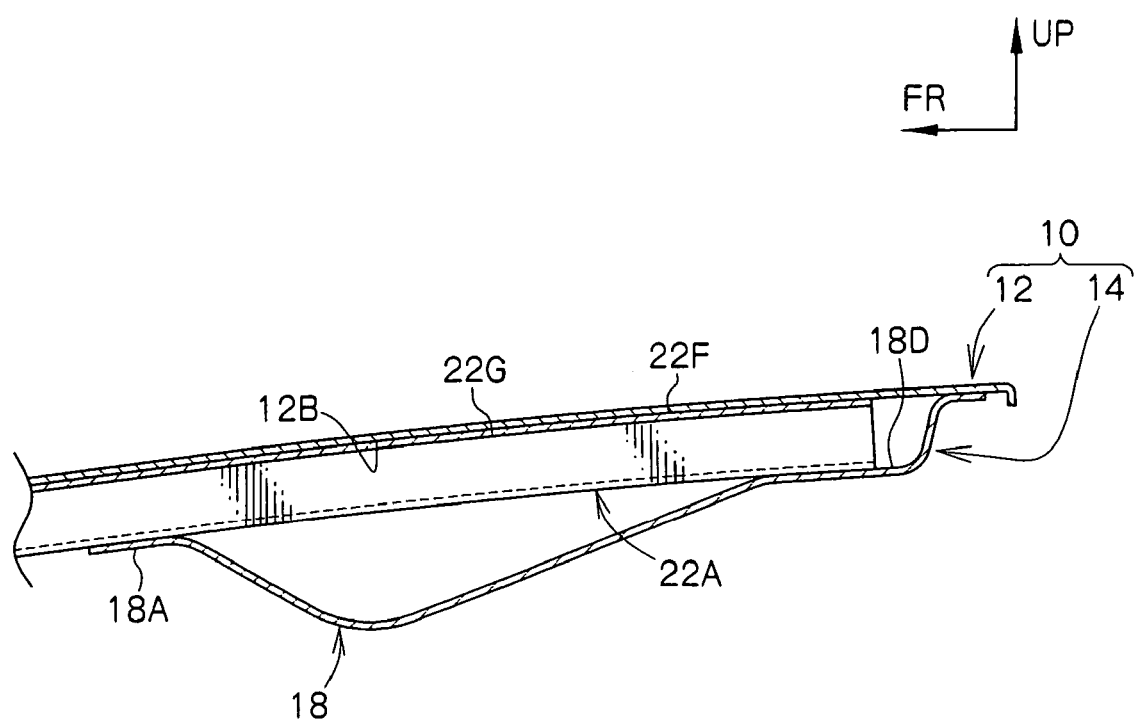
FIG. 22 is a cross-sectional view corresponding to FIG. 12 of the vehicular hood structure pertaining to the modified example of the second embodiment of the invention.
Figure 23:
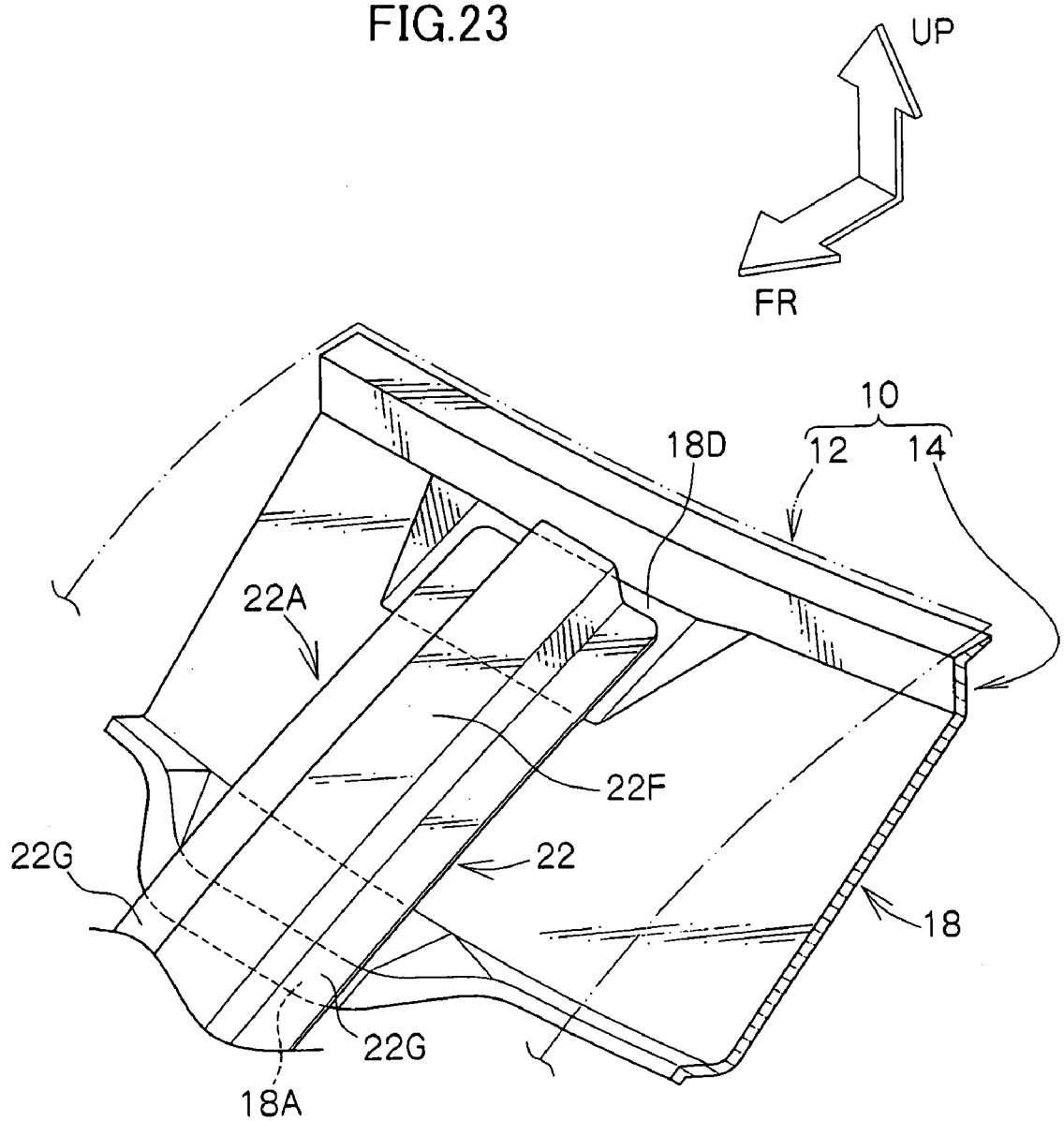
FIG. 23 is a perspective view, seen from diagonally above the vehicle body front, showing a vehicle width-direction center rear end portion of a vehicular hood structure pertaining to a modified example of the second embodiment of the invention.

Also, as shown in FIGS. 22 and 23, the rear end portion 22A of the inner center 22 may extend towards the vehicle body rear from the front flange 18A of the inner rear 18, the upper surface 22F of the inner center 22 may be joined by adhesion or welding to the lower surface 12B of the outer panel 12, and the flanges 22G formed at the open end portion may be joined by adhesion or welding to an upper surface of a rear portion 18D of the inner rear 18. In this case, when a collision body collides with the hood 10 in the vicinity of the rear end portion of the hood 10, local deformation of the outer panel 12 can be suppressed by the rear end portion 22A of the inner center 22. As a result, the outer panel 12 can be prevented from abutting against the rear portion 18D of the inner rear 18 to prevent an unnecessary acceleration from being generated. Also, even in a case where a collision body collides with the hood 10 between adjacent inner centers 22 at the site of the outer panel 12 opposing the inner rear 18, deformation of the outer panel 12 can be suppressed by the adjacent inner centers 22. As a result, the outer panel 12 can be prevented from abutting against the inner rear 18 to prevent an unnecessary acceleration from being generated. Moreover, the rigidity of the hood 10 is improved because the rear end portion 22A of the inner center 22 is disposed between the outer panel 12 and the inner rear 18.

Figure 24:
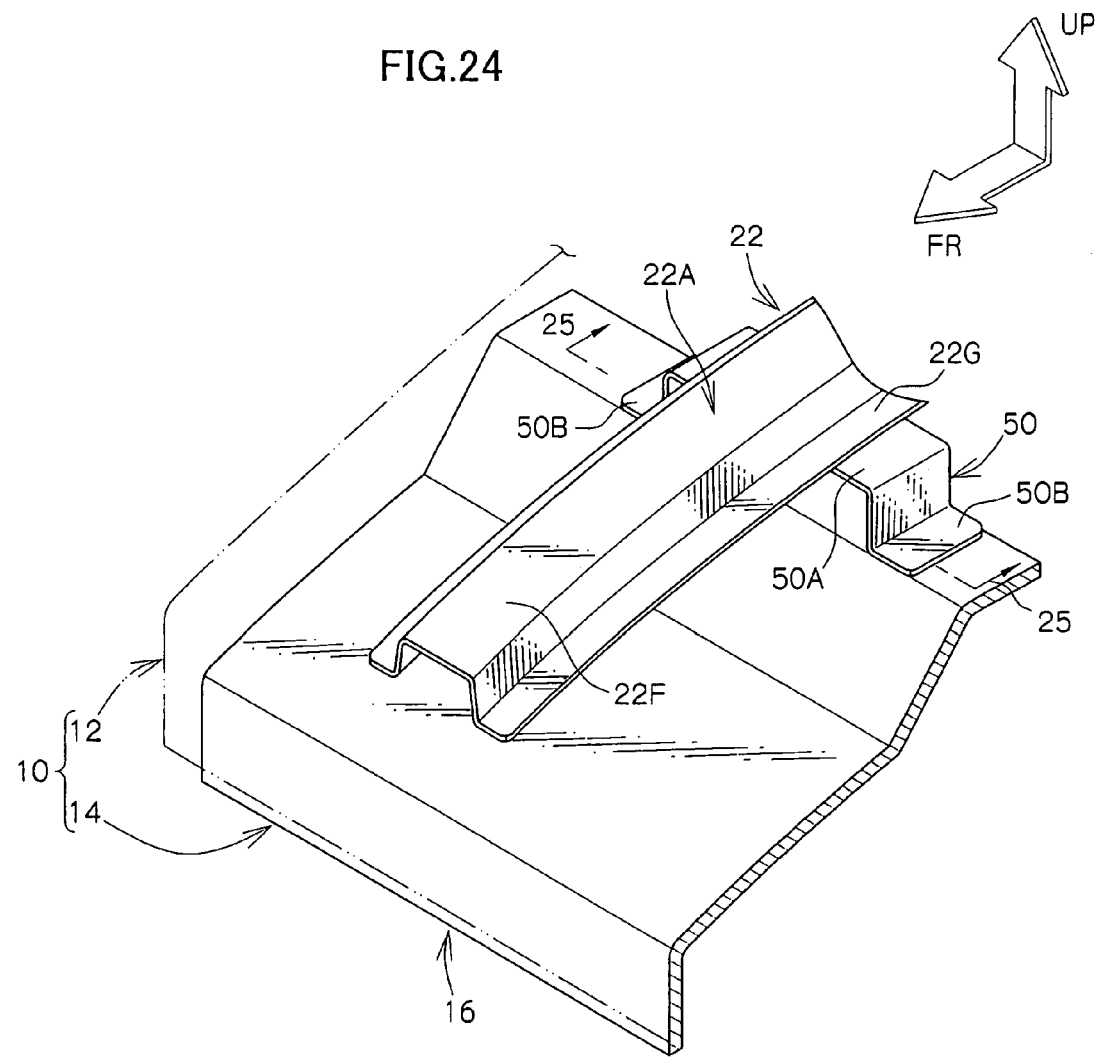
FIG. 24 is a perspective view showing, seen from diagonally above the vehicle body front, a vehicle width-direction center front end portion of a vehicular hood structure pertaining to a modified example of the second embodiment of the invention.
Figure 25:
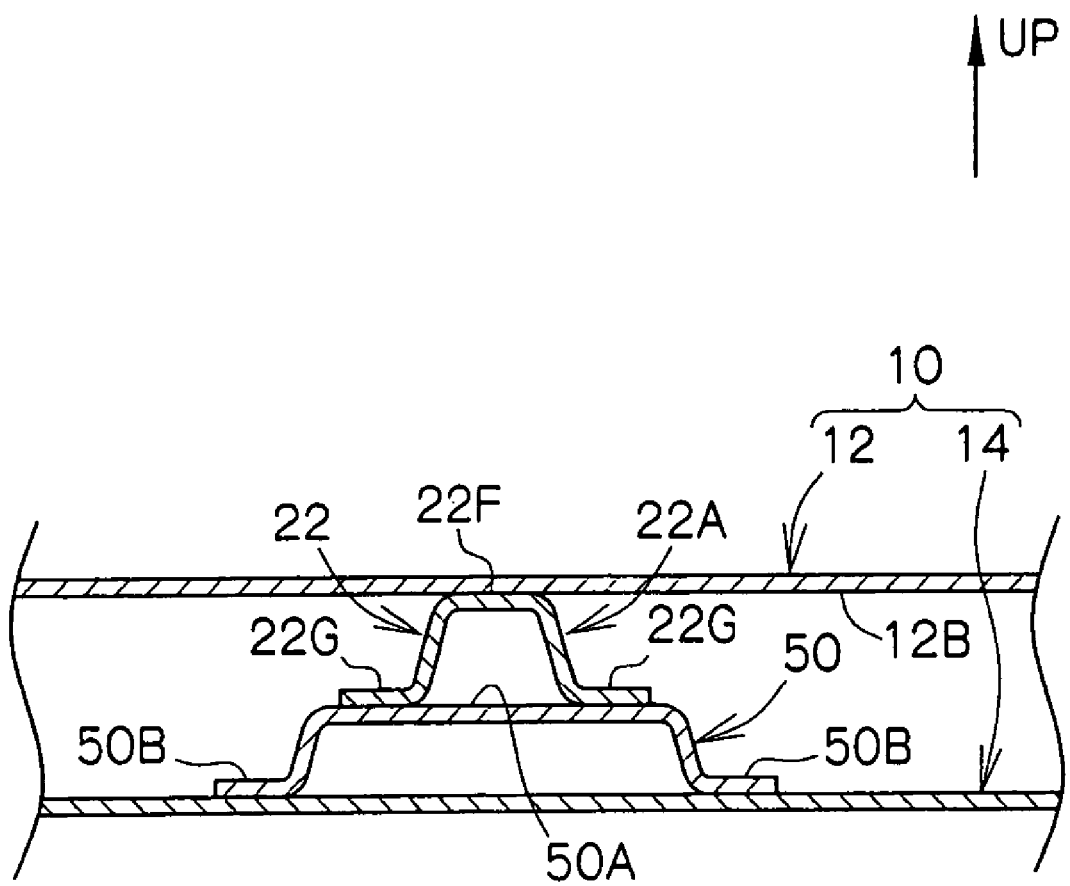
FIG. 25 is an enlarged cross-sectional view along line 25—25 of FIG. 24.

Also, as shown in FIGS. 24 and 25, an impact absorbing bracket 50, where the shape seen from the vehicle body front-rear direction is a hat shape where an open portion thereof is oriented downward, may be disposed between the flanges 22G of the inner center 22 and the rear flange 16A of the inner front 16, the flanges 22G of the inner center 22 may be joined by adhesion or welding to an upper wall portion 50A of the impact absorbing bracket 50, and flanges 50B of the impact absorbing bracket 50 may be joined by adhesion or welding to the upper surface of the rear flange 16A of the inner front 16. In this case, because the second moment of area of the inner center 22 is determined by the rigidity in the central vicinity of the hood 10, there is little freedom for the cross-sectional height of the front end portion 22E of the inner center 22, but by disposing the impact absorbing bracket 50, the freedom for the cross-sectional height increases, it becomes possible to enlarge the gap between the outer panel 12 and the inner front 16, unnecessary impact acceleration can be prevented from being generated, and the secondary impact acceleration can be reduced. Also, the shape and plate thickness of the inner front 16 are also determined by the relation between peripheral parts and the torsional rigidity of the hood 10, there is little design freedom for this site and control of the acceleration is impossible, but by adjusting the shape and plate thickness of the impact absorbing bracket 50, control of the acceleration becomes possible. It should be noted that the impact absorbing bracket 50 may also be disposed between the flanges 22G of the inner center 22 and the front flange 18A of the inner rear 18.

Also, in the second embodiment, the cross-sectional shape of the inner center 22 is a hat shape where the open portion thereof is oriented downward and one inner center 22 is disposed in the vehicle width-direction center portion of the hood 10; however, instead of this, the cross-sectional shape of the inner center 22 may be a cross-sectional hat shape where the open portion thereof is oriented upward and plural inner centers 22 may be disposed at predetermined intervals in the vehicle width direction as shown in FIG. 15. Moreover, the configuration of the second embodiment (FIGS. 8 to 15) and a combinable configuration of the respective configurations shown in FIGS. 16 to 25 may be singly or plurally selectively combined.

Specific embodiments of the invention have been described in detail above, but the invention is not limited to these embodiments. Other various embodiments within the scope of the invention will be apparent to those skilled in the art.

Figure 26:
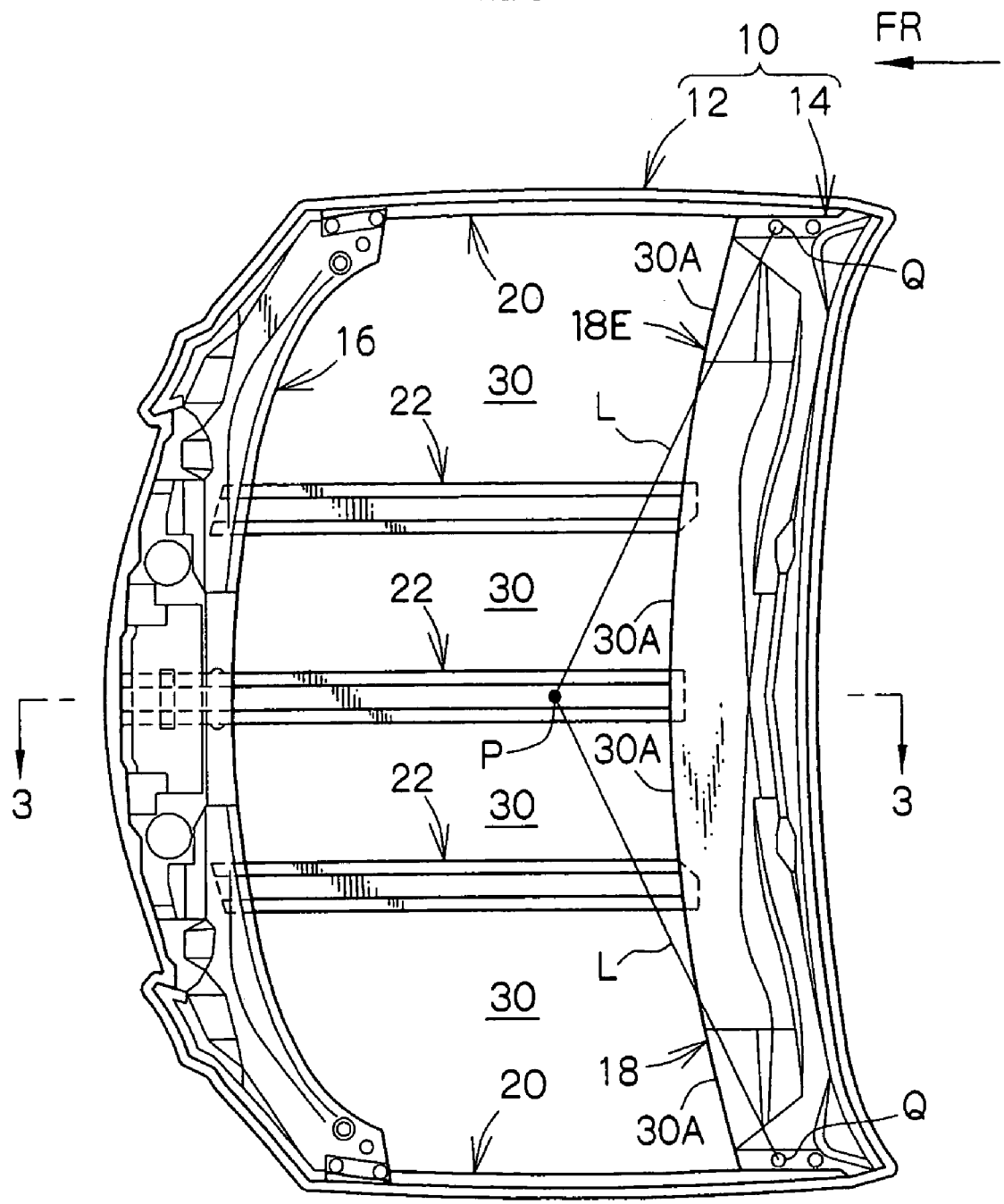
FIG. 26 is a schematic plan view, seen from below the vehicle body, showing a vehicular hood structure pertaining to a third embodiment of the invention.

Next, a third embodiment of the vehicular hood structure of the invention will be described in accordance with FIGS. 1, 2 and 26. It should be noted that identical reference numerals will be given to members that are the same as those of the first embodiment, and that description of those members will be omitted.

The shape, when seen in plan view, of the front end edge portion 18E of the inner rear 18 configuring rear end edge portions 30A of the open portions 30 is an arcuate line shape where the vehicle width-direction center portion thereof is convex towards the vehicle body front. Thus, the rear end edge portions 30A of the open portions 30 are set on an arcuate line where the vehicle width-direction center portion thereof is convex towards the vehicle body front.

Next, the operation of the present embodiment will be described.

In the present embodiment, the rear end edge portions 30A of the open portions 30 formed in the inner panel 14 are set on the front end edge portion 18E of the inner rear 18, i.e. on an arcuate line where the vehicle width-direction center portion thereof is convex towards the vehicle body front. As a result, when a collision body collides with the vehicle width-direction center portion (impact position P) of the rear portion region of the hood 10, the rear end edge portions 30A of the open portions 30 formed in the inner panel 14 approach lines L joining the impact position P of the collision body on the hood 10 with both vehicle width-direction end portions of the hood rear end, e.g., hood hinge attachment portions (attachment positions Q).

Thus, immediately after the collision, the rear portion of the hood 10 including the inner rear 18 can be made to sink towards the vehicle body bottom together with the collision body. For this reason, when a collision body collides with the rear portion region of the hood 10, an unnecessary forward G can be reduced, and the energy absorbing effect with respect to the collision body can be improved.

Next, a fourth embodiment of the vehicular hood structure of the invention will be described in accordance with FIGS. 27 to 29.

It should be noted that identical reference numerals will be given to members that are the same as those of the third embodiment, and that description of those members will be omitted.

Figure 27:
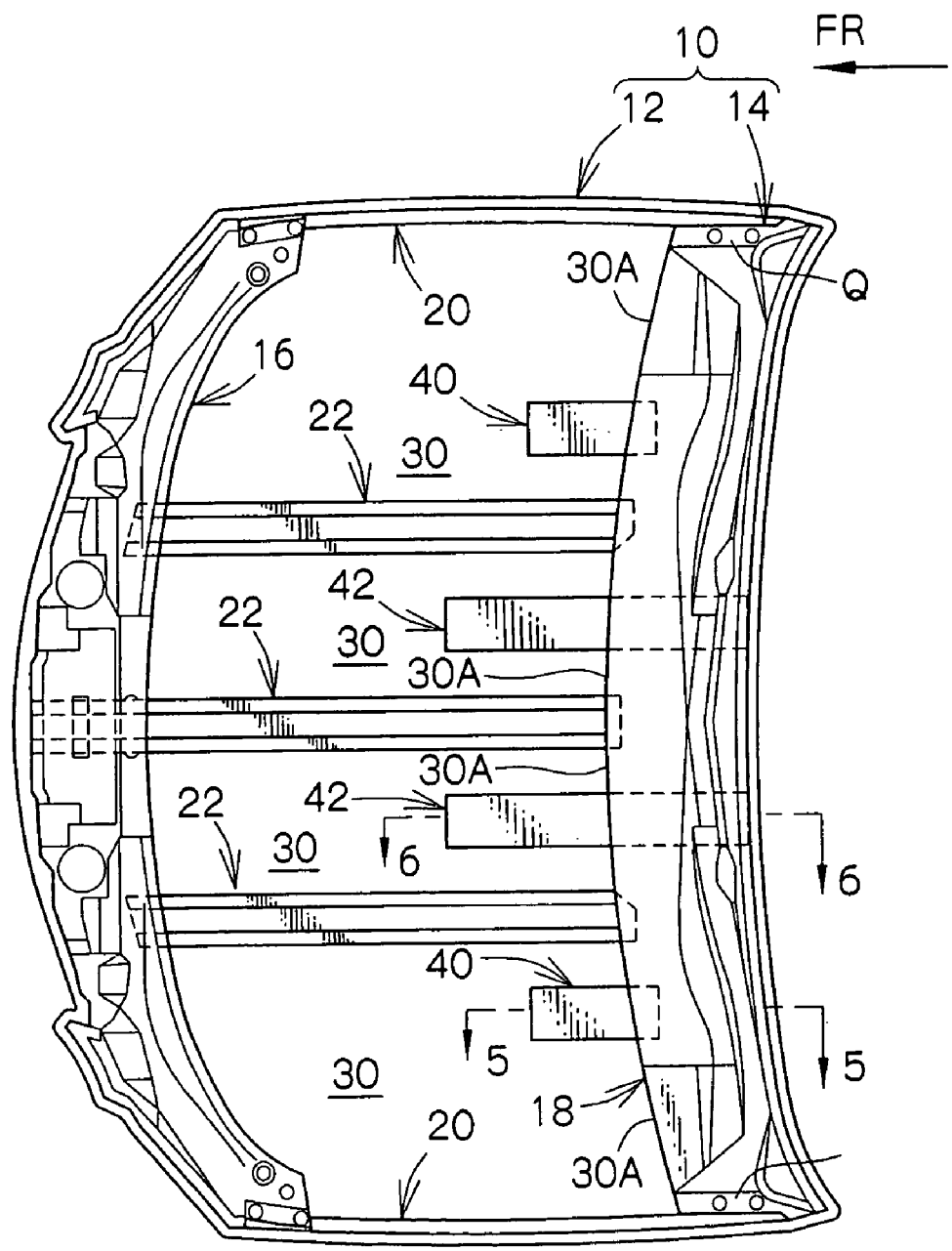
FIG. 27 is a schematic plan view, seen from below the vehicle body, showing a vehicular hood structure pertaining to a fourth embodiment of the invention.

As shown in FIG. 27, in the present embodiment, short band-like reinforcement panels 40 respectively serving as reinforcement members are disposed at the rear end edge portions 30A of both open portions 30 at the vehicle width-direction outer sides. Also, long band-like reinforcement panels 42 respectively serving as reinforcement members are disposed at the rear end edge portions 30A of the two open portions 30 at the vehicle-width direction inner sides.

Figure 28:
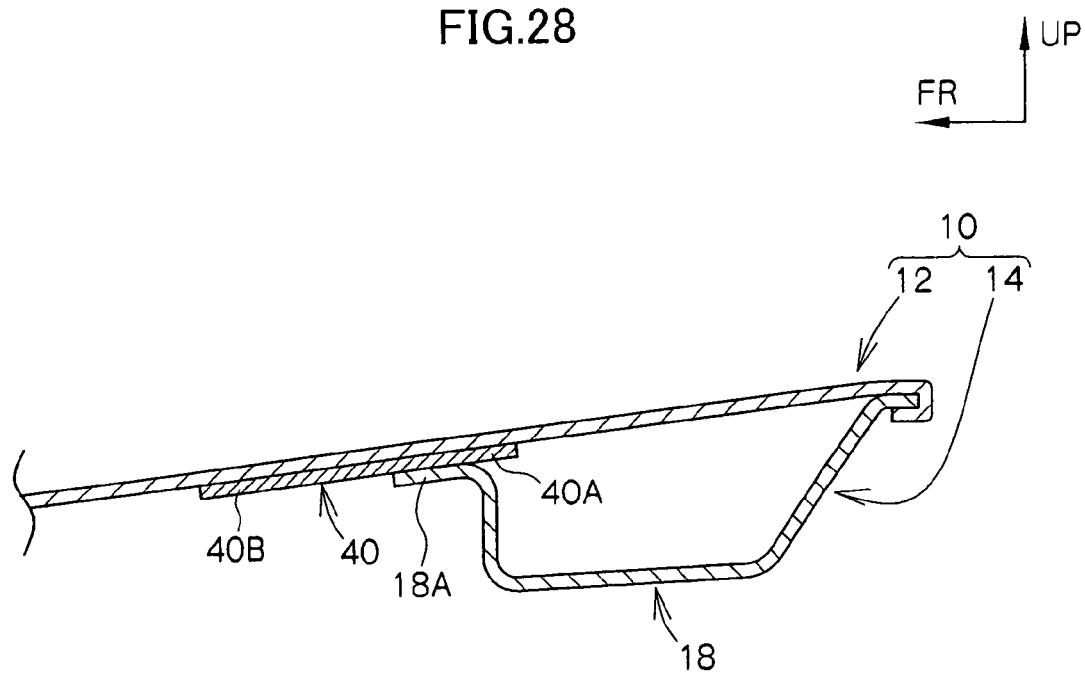
FIG. 28 is an enlarged cross-sectional view along line 5—5 of FIG. 27.

As shown in FIG. 28, rear portions 40A of the reinforcement panels 40 are nipped between the outer panel 12 and the front flange 18A of the inner rear 18, and front portions 40B of the reinforcement panels 40 extend inside the open portions 30.

Figure 29:
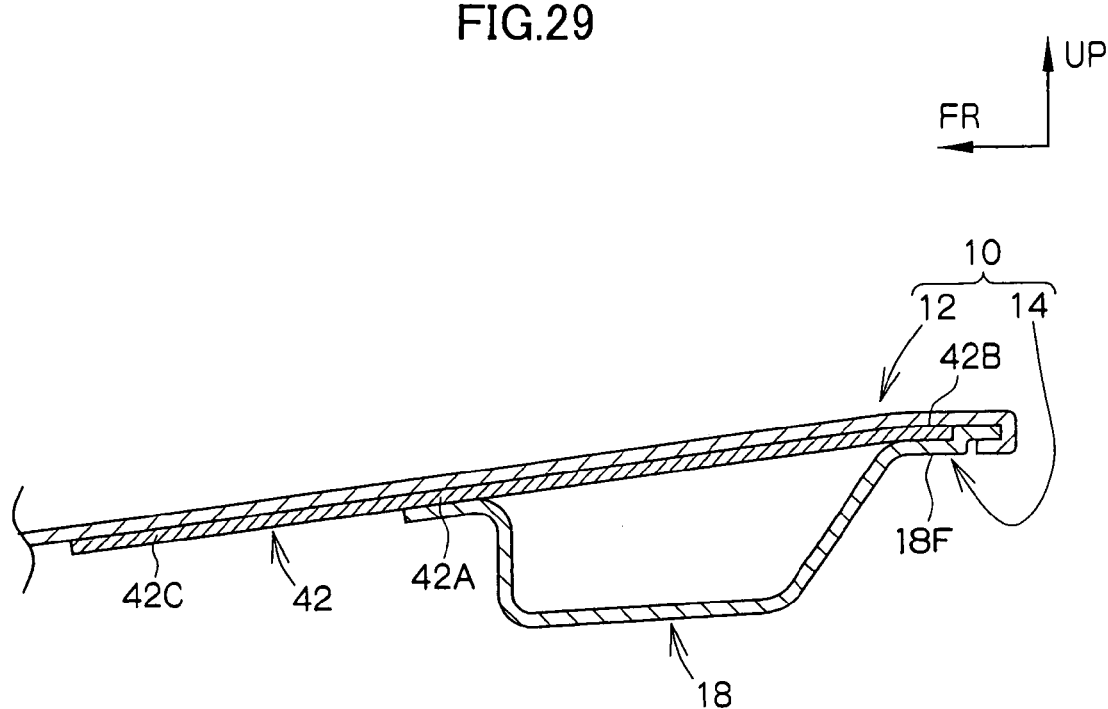
FIG. 29 is an enlarged cross-sectional view along line 6—6 of FIG. 27.

As shown in FIG. 29, front-rear direction mid-portions 42A of the reinforcement panels 42 are nipped between the outer panel 12 and the front flange 18A of the inner rear 18, and rear portions 42B of the reinforcement panels 42 are nipped between the outer panel 12 and a rear flange 18F of the inner rear 18. Also, front portions 42C of the reinforcement panels 42 extend inside the open portions 30.

Next, the operation of the present embodiment will be described.

In the present embodiment, the reinforcement panels 40 and 42 nipped between the inner panel 14 and the outer panel 12 of the hood 10 are disposed along the vehicle body front-rear direction at the rear end edge portions 30A of the open portions 30 at intervals with the left or right inner sides 20 or the inner centers 22. For this reason, when a collision body collides with the hood 10, the generated load of the rear portion region of the hood 10 can be increased virtually without increasing the generated load at the front portion region of the hood 10. As a result, when a collision body collides with the rear portion region of the hood 10, the energy absorbing effect with respect to the collision body can be improved.

With respect to the third and fourth embodiments, the invention is not limited to these embodiments. Other various embodiments within the scope of the invention will be apparent to those skilled in the art. For example, although four open portions 30 were formed in the inner panel 14 of the hood 10 in the third and fourth embodiments, the number of the open portions is not limited to four and may be any number, such as one or more.

Also, although the inner panel 14 of the hood 10 had a divided structure comprising the inner front 16, the inner rear 18, the inner sides 20 and the inner centers 22, the inner panel 14 of the hood 10 may have another divided structure. The inner panel 14 of the hood 10 may also have an integrated structure.

Also, although the band-like reinforcement panels 40 and 42 serving as reinforcement members were used in the fourth embodiment, the reinforcement members are not limited to panels and may be members of cross-sectionally "U" shapes or cross-sectionally hat shapes.

Figure 30:
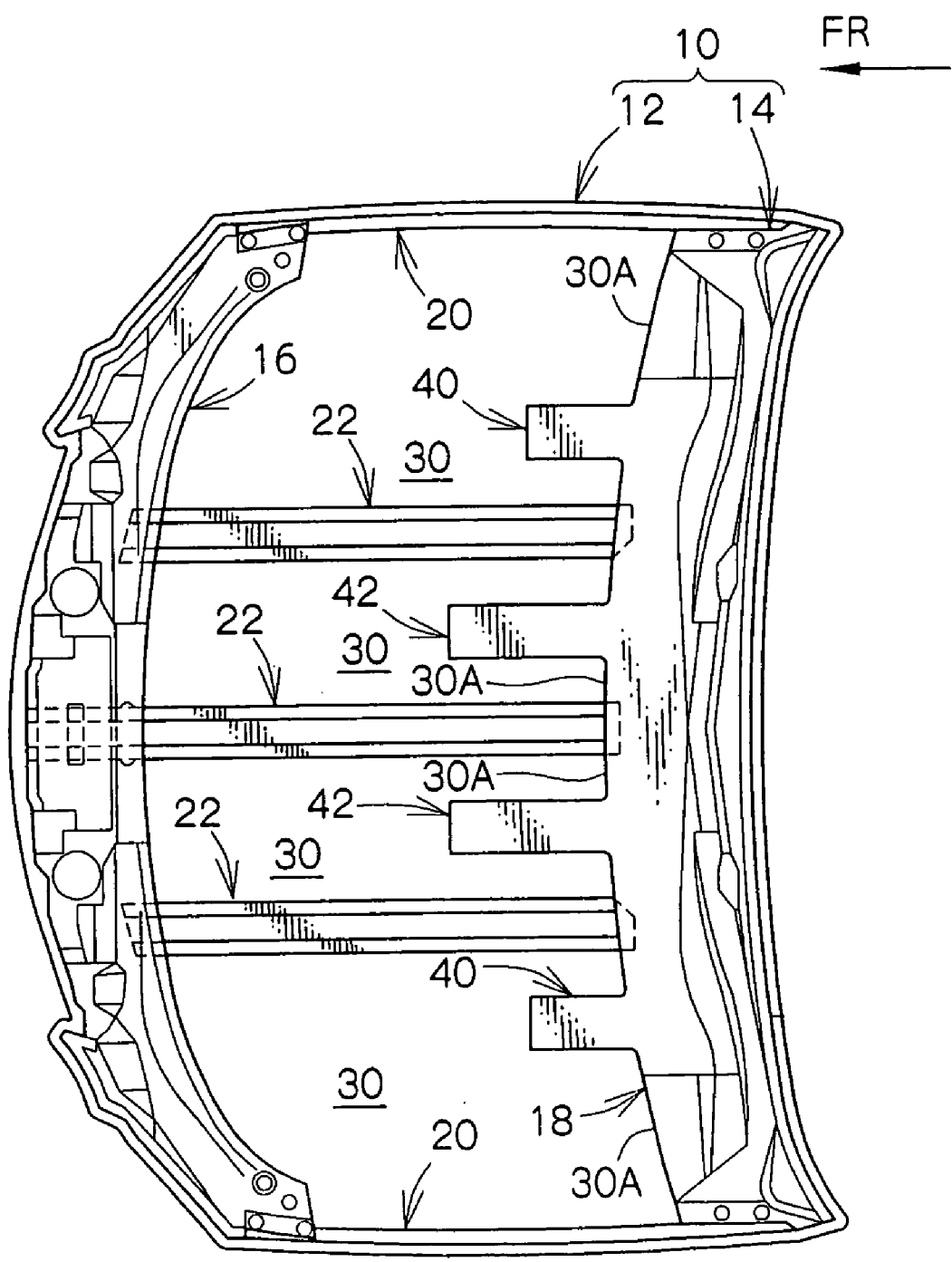
FIG. 30 is a schematic plan view, seen from below the vehicle body, showing a vehicular hood structure pertaining to a modified example of the fourth embodiment of the invention.

Also, as shown in FIG. 30, the reinforcement members (e.g., the reinforcement panels 40 and 42) may be integrally formed with the inner rear 18 configuring the rear end portion of the inner panel 14.

Next, an embodiment of a vehicle body front portion structure of the invention will be described in accordance with FIGS. 1, 2, 31. It should be noted that identical reference numerals will be given to members that are the same as those of the first embodiment, and that description of those members will be omitted.

The shape, when seen in plan view, of a rear end edge portion 16G of the inner front 16 configuring front end edge portions 30A of the open portions 30 is an arcuate line shape where the vehicle width-direction center portion thereof is concave towards the vehicle body front. In the vehicle body of the present embodiment, as shown in FIG. 31, a length L from the front end edge portions 30A of the open portions 30 to a front portion lower end 40A serving as a terminal end site of the front bumper 40 is a substantially constant L at a side cross-section at all positions in the vehicle width direction, and the length L from the front portion lower end 40A of the front bumper 40 to the front end edge portion 30A of the open portions 30 is a line length of an arcuately line along the outer contour of the vehicle body. The shape, when seen in plan view, of a front end edge portion 16H of the inner front 16 is an arcuate line shape where the vehicle width-direction center portion thereof is convex towards the vehicle body front.

Next, the operation of the present embodiment will be described.

In the present embodiment, as shown in FIG. 1, the front end edge portions 30A of the open portions 30 formed in the inner panel 14 are set on an arcuate line where the vehicle width-direction center portion thereof is concave towards the vehicle body front. As shown in FIG. 31, in the vehicle body of the present embodiment, the length L from the front end edge portions 30A of the open portions 30 to the front portion lower end 40A of the front bumper 40 are substantially constant at the side cross-section at all positions in the vehicle width direction.

As a result, assuming that the height of the front portion lower end 40A of the front bumper 40 from the ground is H, in the present embodiment, the length L+H reaching a road surface R from the front end edge portions 30A of the open portions 30 via the front bumper 40 are substantially constant at the side cross-section at all positions in the vehicle width direction.

For this reason, even when a collision body that is long in the vertical direction and is present on the road surface R hits any positions on the front bumper 40 in the vehicle width direction, the length between the position on the hood at which an upper portion of the collision body hits and the front end edge portions 30A of the open portions 30 can be made substantially uniform, whereby the impact load on the upper portion of the collision body can be made uniform when the upper portion of the collision body collides with the front portion region of the hood 10.

Also, in the present embodiment, the shape, when seen in plan view, of the rear end edge portion 16G of the inner front 16 has an arcuate line shape where the vehicle width-direction center portion thereof is concave towards the vehicle body front, and the shape, when seen in plan view, of the front end edge portion 16H of the inner front 16 has an arcuate line shape where the vehicle width-direction center portion thereof is convex towards the vehicle body front. Thus, the width of the inner front 16 in the vehicle body front-rear direction becomes substantially constant. As a result, the yield at the time of molding the inner front 16 is improved, productivity is improved, transportation and storage space are reduced, and it becomes possible to reduce transportation costs and management costs.

A specific embodiment of the vehicle body front portion structure has been described in detail, but the invention is not limited to this embodiment. That other various embodiments within the scope of the invention are possible will be apparent to those skilled in the art. For example, although four open portions 30 were formed in the inner panel 14 of the hood 10 in the embodiment of the vehicle body front portion structure, the number of the open portions is not limited to four and may be any number, such as one or more.

Also, in the embodiment of the vehicle body front portion structure, although the inner panel 14 of the hood 10 had a divided structure comprising the inner front 16, the inner rear 18, the inner sides 20 and the inner centers 22, the inner panel 14 of the hood 10 may have another divided structure. The inner panel 14 of the hood 10 may also have an integrated structure.

What is claimed is:

1. A vehicular hood structure comprising an outer member configuring a vehicle body outer side surface of a hood and an inner member disposed at the inner side of the outer member, wherein the vehicular hood structure includes
  a front end portion inner member configuring a front end portion of the inner member,
  a rear end portion inner member configuring a rear end portion of the inner member,
  a front-rear direction inner side members that are disposed along the vehicle body front-rear direction between the front end portion inner member and the rear end portion inner member and that bridge the front end portion inner member and the rear end portion inner member, configuring side portions in a vehicle width direction of the inner member; and
  at least one front-rear direction inner center member disposed along the vehicle body front-rear direction between the front end portion inner member and the rear end portion inner member that bridges the front end portion inner member and the rear end portion inner member, that is disposed between the front-rear direction inner side members,
  wherein the front-rear direction inner side members and the front-rear direction inner center member are each independent parts, are each substantially longitudinal shaped parts, and are disposed substantially in parallel along the vehicle body front-rear direction.

2. The vehicular hood structure of claim 1, wherein a surface of the front-rear direction inner center member opposing the outer member is smoothly formed, has a shape along an undersurface of the outer member and extends as far as front and rear ends of the outer member.

3. The vehicular hood structure of claim 1, wherein a front end portion of the front-rear direction inner center member extends above a hood lock or a hood stopper.

4. The vehicular hood structure of claim 1, wherein a front end portion of the front-rear direction inner center member is nipped and joined between the outer member and the front end portion inner member, and a rear end portion of the front-rear direction inner center member is nipped and joined between the outer member and the rear end portion inner member.

5. The vehicular hood structure of claim 2, wherein lower portions of left and right side wall portions of a front end portion of the front-rear direction inner center member are joined to the front end portion inner member.

6. The vehicular hood structure of claim 2, wherein lower portions of left and right side walls of the front-rear direction inner center member are joined to at least one of end portions of a hood lock striker.

7. The vehicular hood structure of claim 5, wherein a stepped portion including a fold line in the vehicle body front-rear direction is formed in the side wall portion of the front-rear direction inner center member.

8. The vehicular hood structure of claim 1, wherein
  front and rear end portions of the front-rear direction inner center members plurally disposed at predetermined intervals in the vehicle width direction are nipped and joined between the outer member and the front end portion inner member and the outer member and the rear end portion inner member, and
  between adjacent joint portions, gaps are formed between the outer member and the front end portion inner member and the outer member and the rear end portion inner member.

9. The vehicular hood structure of claim 1, wherein an impact absorbing bracket is provided between, at least one of a lower surface of the front-rear direction inner center member and an upper surface of the front end portion inner member and the lower surface of the front-rear direction inner center member and an upper surface of the rear end portion inner member.

10. The vehicular hood structure of claim 1, wherein a recessed portion formed in a front portion of the rear end portion inner member is partially or completely closed off by the front-rear direction inner center member.

11. A vehicular hood structure comprising an outer member configuring a vehicle body outer side surface of a hood and an inner member disposed at the inner side of the outer member, wherein the vehicular hood structure includes
  a front end portion inner member configuring a front end portion of the inner member,
  a rear end portion inner member configuring a rear end portion of the inner member,
  front-rear direction inner side members that are disposed along the vehicle body front-rear direction between the front end portion inner member and the rear end portion inner member and that bridge the front end portion inner member and the rear end portion inner member, configuring side portions in a vehicle width direction of the inner member, and
  at least one front-rear direction inner center member that is disposed along the vehicle body front-rear direction between the front end portion inner member and the rear end portion inner member and that bridges the front end portion inner member and the rear end portion inner member, and that is disposed between the front-rear direction inner side members,
  wherein the vehicular hood structure includes open portions formed in the inner member between the front-rear direction inner side members and front-rear direction inner center member, and
  wherein a front end edge portion of the rear end portion inner member defines an arcuate line with a vehicle width-direction center portion thereof being convex towards the vehicle body front and the rear end edge portions of the open portions are disposed on the arcuate line.

12. A vehicular hood structure comprising an outer member configuring a vehicle body outer side surface of a hood and an inner member disposed at the inner side of the outer member, wherein the vehicular hood structure includes
- a front end portion inner member configuring a front end portion of the inner member,
- a rear end portion inner member configuring a rear end portion of the inner member,
- front-rear direction inner members that are disposed along the vehicle body front-rear direction between the front end portion inner member and the rear end portion inner member and that bridge the front end portion inner member and the rear end portion inner member, configuring side portions in a vehicle width direction of the inner member,
- at least one front-rear direction inner center member that is disposed along the vehicle body front-rear direction between the front end portion inner member and the rear end portion inner member and that bridges the front end portion inner member and the rear end portion inner member, and that is disposed between the front-rear direction inner side members,
- open portions formed in the inner member between the front-rear direction inner side members and front-rear direction inner center member, and
- at least one reinforcement member disposed along the vehicle body front-rear direction between the front-rear direction inner side members and the front-rear direction inner center member, having a vehicle-width-direction-space against the front-rear direction inner side members or the front-rear direction inner center member, and disposed at a rear end edge portion of the open portion, a front end portion of the reinforcement member being disposed within the open portion and not being connected to the front end portion inner member.

13. A vehicle body front portion structure comprising:
a vehicular hood comprising a hood outer member configuring a vehicle body outer side surface and a hood inner member that is disposed at the inner side of the outer member and includes at least one open portion formed between a front end portion inner member configuring a front end portion of the inner member, a rear-end portion inner member configuring a rear end portion of the inner member, front-rear direction inner members that are disposed along the vehicle body front-rear direction between the front end portion inner member and the rear end portion inner member and that bridge the front end portion inner member and the rear end portion inner member; and
a front bumper, wherein
at all side cross-sections cut along the vehicle body front-rear direction at a vehicle body front portion, a length (L) from an end portion of the front bumper to a front end edge portion of the open portion is substantially constant.

14. The vehicle body front portion structure of claim 13, wherein the length from the end portion of the front bumper to the front end edge portion of the open portion is a length of an arcuate curved line along the outer contour of the vehicle body.

15. The vehicular hood structure of claim 7, wherein at a coupling portion of the front-rear direction inner center member, the front-rear direction inner center member is coupled via another member.

16. The vehicular hood structure of claim 12, wherein the at least one reinforcement member is formed integrally with the rear end portion inner member.

17. The vehicular hood structure of claim 2, wherein side wall portions of a front end portion of the front-rear direction inner center member are joined to a lock reinforcement.

18. The vehicle body front portion structure of claim 13, wherein the length from a lower portion of the end portion of the front bumper to the front end edge portion of the open portion is substantially constant.

* * * * *

UNITED STATES PATENT AND TRADEMARK OFFICE
CERTIFICATE OF CORRECTION

PATENT NO. : 7,052,079 B2
APPLICATION NO. : 10/879743
DATED : May 30, 2006
INVENTOR(S) : Yoshihide Endo et al.

It is certified that error appears in the above-identified patent and that said Letters Patent is hereby corrected as shown below:

Claim 12, col. 19, line 12 - "front-rear direction inner members" should read --front-rear direction inner side members--

Signed and Sealed this

Twenty Second Day of April, 2008

JON W. DUDAS
*Director of the United States Patent and Trademark Office*